(12) United States Patent
Hosseini et al.

(10) Patent No.: US 10,893,481 B2
(45) Date of Patent: Jan. 12, 2021

(54) POWER CONTROL FOR SHORTENED TRANSMISSION TIME INTERVALS

(71) Applicant: QUALCOMM Incorporated, San Diego, CA (US)

(72) Inventors: Seyedkianoush Hosseini, San Diego, CA (US); Alberto Rico Alvarino, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/536,002

(22) Filed: Aug. 8, 2019

(65) Prior Publication Data
US 2020/0053656 A1  Feb. 13, 2020

Related U.S. Application Data

(60) Provisional application No. 62/717,757, filed on Aug. 10, 2018.

(51) Int. Cl.
| | |
|---|---|
| *H04W 52/14* | (2009.01) |
| *H04W 24/10* | (2009.01) |
| *H04W 72/04* | (2009.01) |
| *H04B 7/06* | (2006.01) |
| *H04L 1/00* | (2006.01) |
| *H04W 24/08* | (2009.01) |

(Continued)

(52) U.S. Cl.
CPC ........ *H04W 52/146* (2013.01); *H04B 7/0626* (2013.01); *H04B 7/0632* (2013.01); *H04B 7/0639* (2013.01); *H04L 69/324* (2013.01); *H04W 24/08* (2013.01); *H04W 72/0446* (2013.01); *H04B 7/0413* (2013.01)

(58) Field of Classification Search
None
See application file for complete search history.

(56) References Cited

U.S. PATENT DOCUMENTS

| | | | |
|---|---|---|---|
| 2018/0139030 A1* | 5/2018 | Kim | H04L 5/0042 |
| 2018/0310298 A1* | 10/2018 | Li | H04L 1/1812 |
| 2019/0028162 A1 | 1/2019 | Lee et al. | |

(Continued)

FOREIGN PATENT DOCUMENTS

| | | |
|---|---|---|
| EP | 3413496 A1 | 12/2018 |
| WO | WO-2016163855 A1 | 10/2016 |
| WO | WO-2017135745 A1 | 8/2017 |

OTHER PUBLICATIONS

International Search Report and Written Opinion—PCT/US2019/045855—ISA/EPO—dated Nov. 20, 2019.

(Continued)

*Primary Examiner* — Hong S Cho

(57) ABSTRACT

Certain aspects of the present disclosure relate to methods and apparatuses for power control of transmissions on a physical uplink shared channel (PUSCH) with shortened transmission time intervals (sTTIs). According to certain aspects, a UE may calculate a transmit power for an aperiodic channel state information (A-CSI) report that is independent of an actual number of channel quality indicator (CQI) and precoding matrix indicator (PMI) bits to transmit in the A-CSI report. The UE may then transmit the A-CSI report in accordance with the calculated transmit power.

31 Claims, 18 Drawing Sheets

(51) Int. Cl.
*H04L 29/08* (2006.01)
*H04B 7/0413* (2017.01)

(56) References Cited

U.S. PATENT DOCUMENTS

2019/0081678 A1 3/2019 Park et al.
2019/0215781 A1 7/2019 Jeon et al.

OTHER PUBLICATIONS

LG Electronics: "Discussions on CSI Reporting", 3GPP Draft; R1-1715858 CSI Reporting V2, 3rd Generation Partnership Project (3GPP), Mobile Competence Centre ; 650, Route Des Lucioles ; F-06921 Sophia-Antipolis Cedex; France, vol. RAN WG1, No. Nagoya, Japan; Sep. 18, 2017-Sep. 21, 2017, Sep. 17, 2017 (Sep. 17, 2017), XP051339318, 11 Pages, Retrieved from the Internet: URL:http://www.3gpp.org/ftp/Meetings_3GPP_SYNC/RAN1/Docs/ [retrieved on Sep. 17, 2017].

ZTE et al., "Offline Summary for Al 7.6.1 NR UL Power Control in Non-CA Aspects", 3GPP Draft; R1-1801047 Offline Summary for AL7 6 1 NR UL Power Control in Non-CA Aspects V3, 3rd Generation Partnership Project—(3GPP), Mobile Competence Centre ; 650, Route Des Lucioles ; F-06921 Soph, vol. RAN WG1, No. Vancouver, Canada; Jan. 22, 2018-Jan. 26, 2018, Jan. 24, 2018 (Jan. 24, 2018), XP051385286, 28 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 24, 2018].

\* cited by examiner $\Delta_{TF,c}(i) = 10\log_{10}\left(\left(2^{BPRE \cdot K_S} - 1\right) \cdot \beta_{offset}^{PUSCH}\right)$ for $K_S = 1.25$ and 0 for $K_S = 0$ where $K_S$ is given by the parameter *deltaMCS-Enabled* provided by higher layers for each serving cell $c$. $BPRE$ and $\beta_{offset}^{PUSCH}$, for each serving cell $c$, are computed as below. $K_S = 0$ for transmission mode 2.

- $BPRE = O_{CQI} / N_{RE}$ for control data sent via subframe-PUSCH without UL-SCH data or slot/sublot-PUSCH without UL-SCH data if the UE is configured with a higher layer parameter *uplinkPower-CSIPayload*. $BPRE = O'_{CQI} = O_{CQI}$ assuming RI = 1 for slot/subslot-PUSCH without UL-SCH data if $BPRE = O'_{CQI} / N_{RE}$ and $O'_{CQI} = O_{CQI}$ assuming RI = 1 for slot/subslot-PUSCH without UL-SCH data if the UE is not configured with a higher layer parameter *uplinkPower-CSIPayload*. $BPRE = \sum_{r=0}^{C-1} K_r / N_{RE}$ for other cases.

FIG. 11

$\Delta_{TF,c}(i) = 10\log_{10}\left(\left(2^{BPRE \cdot K_S} - 1\right) \cdot \beta_{offset}^{PUSCH}\right)$ for $K_S = 1.25$ and 0 for $K_S = 0$ where $K_S$ is given by the parameter *deltaMCS-Enabled* provided by higher layers for each serving cell $c$. BPRE and $\beta_{offset}^{PUSCH}$, for each serving cell $c$, are computed as below. $K_S = 0$ for transmission mode 2.

- BPRE = $O_{CQI}/N_{RE}$ for control data sent via subframe-PUSCH without UL-SCH data or slot/sublot-PUSCH without UL-SCH data if the UE is configured with a higher layer parameter *uplinkPower-CSIPayload*. BPRE = $O'_{CQI}/N_{RE}$ and $O'_{CQI} = \max\{O_{CQI}, RI\}$ with $O_{CQI}, RI$ defined as the number of CQI/PMI bits including CRC for a given RI value for slot/subslot-PUSCH without UL-SCH data if the UE is not configured with a higher layer parameter *uplinkPower-CSIPayload*. BPRE = $\sum_{r=0}^{C-1} K_r / N_{RE}$ for other cases.

FIG. 14

POWER CONTROL FOR SHORTENED TRANSMISSION TIME INTERVALS

CLAIM OF PRIORITY UNDER 35 U.S.C. § 119

The present application for patent claims benefit of U.S. Provisional Patent Application Ser. No. 62/717,757, filed Aug. 10, 2018, assigned to the assignee hereof and hereby expressly incorporated by reference herein.

FIELD

The present disclosure relates generally to wireless communication systems, and more particularly, to transmit power control for shortened transmission time intervals (sTTIs) in low latency communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A networks, a set of one or more base stations may define an eNodeB (eNB). In other examples (e.g., in a next generation or 5th generation (5G) network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is New Radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the present disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include improved communications between access points and user equipment devices in a wireless network.

Certain aspects provide a method for wireless communications by a user equipment (UE). The method generally includes receiving signaling of a configuration parameter, receiving a request for an aperiodic channel state information (A-CSI) report, calculating a transmit power for the A-CSI report that is independent of an actual number of channel quality indicator (CQI) bits to transmit in the A-CSI report when the configuration parameter is set to a first value or dependent on the actual number of CQI bits to transmit in the A-CSI report when the configuration parameter is set to a second value, and transmitting the A-CSI report in accordance with the calculated transmit power.

In some cases, the configuration parameter is associated with a reduced transmission time interval (TTI) for uplink transmissions by the UE.

In some cases, the transmit power calculated for the A-CSI report is independent of an actual number of CQI and precoding matrix indicator (CQI/PMI) bits to transmit in the A-CSI report.

In some cases, the transmit power is calculated based, at least in part, on a bits per resource element (BPRE) parameter and calculating transmit power for the A-CSI report independently of the actual number of CQI/PMI bits to transmit in the A-CSI report comprises determining a value for the BPRE parameter that is independent of the actual number of CQI/PMI bits to transmit in the A-CSI report. In some cases, determining a value for the BPRE parameter that is independent of the actual number of CQI/PMI bits to transmit in the A-CSI report comprises calculating the value for the BPRE parameter assuming a maximum number of CQI/PMI bits corresponding to a rank indicator in a set of rank indicators supported by the UE. In some cases, the value for the BPRE parameter is calculated assuming a maximum number of CQI/PMI bits corresponding to the rank indicator in the set of rank indicators supported by the UE when the A-CSI report is to be sent in a physical uplink shared channel (PUSCH) without uplink shared channel (UL-SCH) data. In some cases, the maximum number of CQI/PMI bits comprises cyclic redundancy check (CRC) bits.

In some cases, the method also includes providing an indication of a capability of the UE to support determining the value for the BPRE parameter that is independent of the actual number of CQI/PMI bits. In some cases, the UE provides the indication of the capability for a given transmission time interval (TTI) length. In some cases, the given TTI length comprises at least one of a slot or sub-slot.

Certain aspects provide an apparatus for wireless communications by a user equipment (UE). The apparatus generally includes means for receiving signaling of a configuration parameter, receiving a request for an aperiodic channel state information (A-CSI) report, means for calculating a transmit power for the A-CSI report that is independent of an actual number of channel quality indicator (CQI) bits to transmit in the A-CSI report when the configuration parameter is set to a first value or dependent on the actual number of CQI bits to transmit in the A-CSI report when the configuration parameter is set to a second value, and means for transmitting the A-CSI report in accordance with the calculated transmit power.

Certain aspects provide an apparatus for wireless communications by a user equipment (UE). The apparatus generally includes a receiver configured to receive signaling of a configuration parameter, receiving a request for an aperiodic channel state information (A-CSI) report, at least one processor configured to calculate a transmit power for the A-CSI report that is independent of an actual number of channel quality indicator (CQI) bits to transmit in the A-CSI report if the configuration parameter is set to a first value or dependent on the actual number of CQI bits to transmit in the A-CSI report if the configuration parameter is set to a second value, and a transmitter configured to transmit the A-CSI report in accordance with the calculated transmit power.

Certain aspects provide a non-transitory computer readable medium having instructions stored thereon for receiving signaling of a configuration parameter, receiving a request for an aperiodic channel state information (A-CSI) report, calculating a transmit power for the A-CSI report that is independent of an actual number of channel quality indicator (CQI) bits to transmit in the A-CSI report if the configuration parameter is set to a first value or dependent on the actual number of CQI bits to transmit in the A-CSI report if the configuration parameter is set to a second value, and transmitting the A-CSI report in accordance with the calculated transmit power.

Certain aspects provide a method for wireless communications by a user equipment (UE). The method generally includes receiving a request for an aperiodic channel state information (A-CSI) report, calculating a transmit power for the A-CSI report that is independent of an actual number of channel quality indicator (CQI) bits to transmit in the A-CSI report, and transmitting the A-CSI report in accordance with the calculated transmit power.

Certain aspects of the present disclosure provide an apparatus for wireless communications by a user equipment (UE). The apparatus generally includes means for receiving a request for an aperiodic channel state information (A-CSI) report, means for calculating a transmit power for the A-CSI report that is independent of an actual number of channel quality indicator (CQI) bits to transmit in the A-CSI report, and means for transmitting the A-CSI report in accordance with the calculated transmit power.

Certain aspects of the present disclosure provide an apparatus for wireless communications by a user equipment (UE). The apparatus generally includes a receiver configured to receive a request for an aperiodic channel state information (A-CSI) report, at least one processor coupled to the receiver. The at least one processor may be configured to calculate a transmit power for the A-CSI report that is independent of an actual number of channel quality indicator (CQI) bits to transmit in the A-CSI report. The apparatus may also include a transmitter which is coupled to the at least one processor configured to transmit the A-CSI report in accordance with the calculated transmit power.

Certain aspects of the present disclosure provide a non-transitory computer readable medium having instructions stored thereon. The instructions generally include instructions for receiving a request for an aperiodic channel state information (A-CSI) report, calculating a transmit power for the A-CSI report that is independent of an actual number of channel quality indicator (CQI) bits to transmit in the A-CSI report, and transmitting the A-CSI report in accordance with the calculated transmit power.

Certain aspects provide a method for wireless communications by a user equipment (UE). The method generally includes receiving a request for an aperiodic channel state information (A-CSI) report, calculating a transmit power for the A-CSI report based on a power control parameter, wherein the power control parameter is based on a predetermined rank indicator (RI). The method may include determining an actual size of a payload to transmit in the A-CSI report, based on an actual rank indicator (RI), and transmitting the A-CSI report in a physical uplink shared channel (PUSCH) without data, based on the actual RI and the calculated transmit power.

Certain aspects provide a method for wireless communications by a network entity. The method generally includes receiving an indication of a UE capability to calculate transmit power for an aperiodic channel state information (A-CSI) report that is independent of an actual number of CQI bits, providing signaling of a parameter indicating whether the UE is to calculate transmit power for the A-CSI report independent of the actual number of CQI bits (or based upon the actual number of CQI bits), and transmitting a request for the A-CSI report.

Certain aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 11 illustrates one example of calculating certain power control parameters, in accordance with certain aspects of the present disclosure.

FIG. 14 illustrates another example of calculating certain power control parameters, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
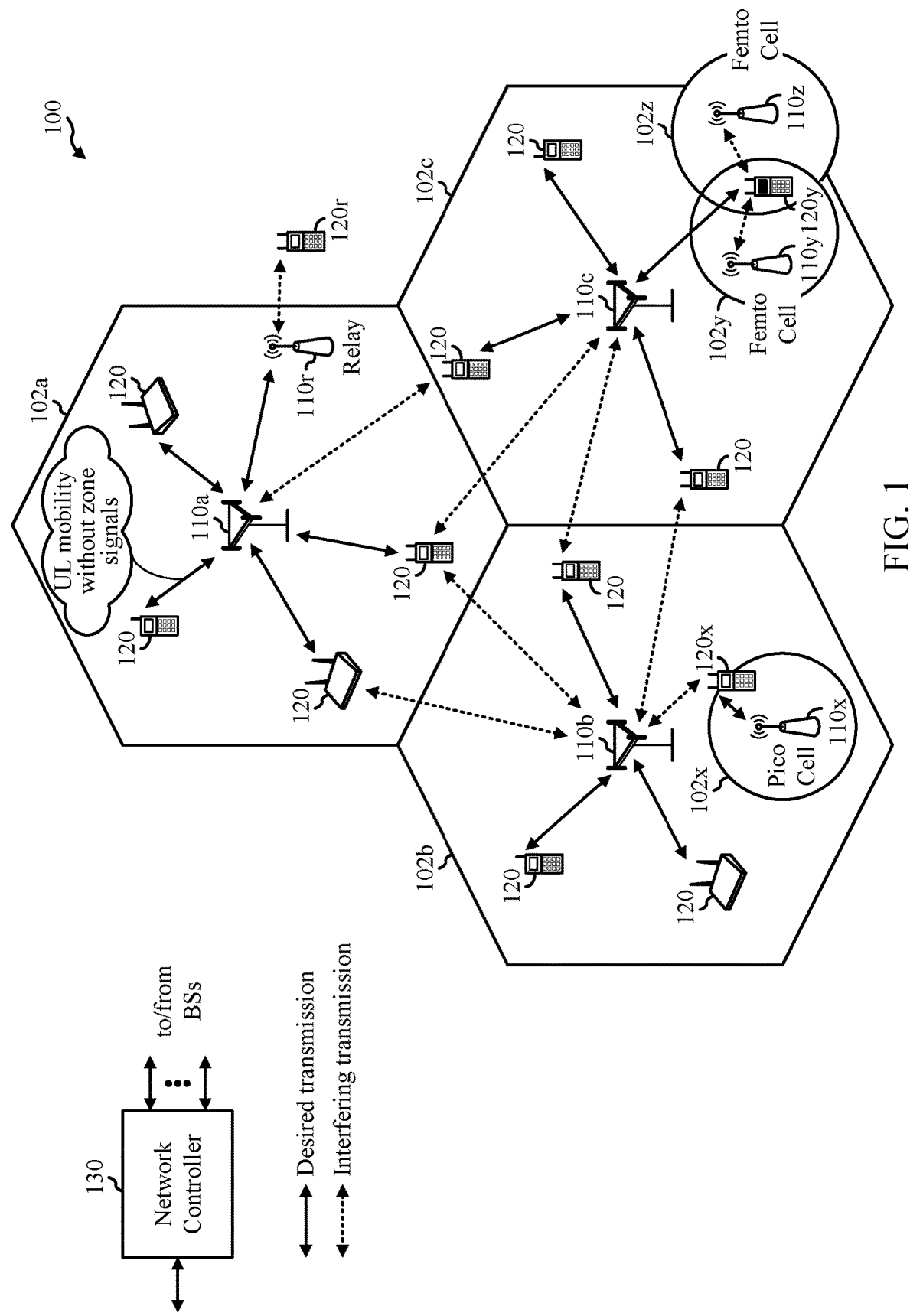
FIG. 1 is a block diagram illustrating an exemplary telecommunications system, in accordance with certain aspects of the present disclosure.

3GPP wireless communication standards have proposed transmission time intervals (TTIs) with shorter durations (e.g., shortened TTIs (sTTIs)) for low latency communication.

A base station may transmit to one or more UEs using a transmission time interval (TTI) that is reduced in length. Such a TTI may be referred to as a shortened TTI (sTTI) and a user receiving a sTTI may be a low latency user. A sTTI may be divided into a number of resource blocks across a system bandwidth, and each of the resource blocks may be allocated to a UE by the base station. The base station may transmit control information or a control message in a first portion (e.g., control region) of a resource block to provide resource allocations. A low latency user may attempt to decode the control information in the resource block to determine a data region allocated within the same sTTI.

When the base station triggers an aperiodic channel state information (A-CSI) report, the UE may determine an uplink transmit power. However, with current approaches, the uplink power calculation may depend on the payload of the A-CSI report. For instance, the UE may need to know an actual number of channel quality indicator and precoding matrix indicator (CQI/PMI) bits ($O_{CQI}$) in order to determine a bits-per-resource-element (BPRE) parameter which, in turn, is needed to calculate PUSCH transmit power. The actual number of CQI/PMI bits may depend upon a rank indicator (RI) of the channel resulting in a requirement for the UE to complete its CSI processing before it can calculate uplink transmit power. Given the short processing time available under sTTI operation, it is desirable to make the CSI processing and uplink power calculation independent of each other. The present disclosure provides techniques for decoupling CSI and uplink transmit power calculations in support of low latency operation.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, a UE 120 may be configured to perform uplink power control for A-CSI reporting via sTTI PUSCH transmissions according to operations shown in FIGS. 10 and/or 12. Similarly, a BS 110 may be configured to configure a UE for uplink power control for A-CSI reporting via sTTI PUSCH transmissions according to operations shown in FIG. 13.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth (e.g., system frequency band) into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
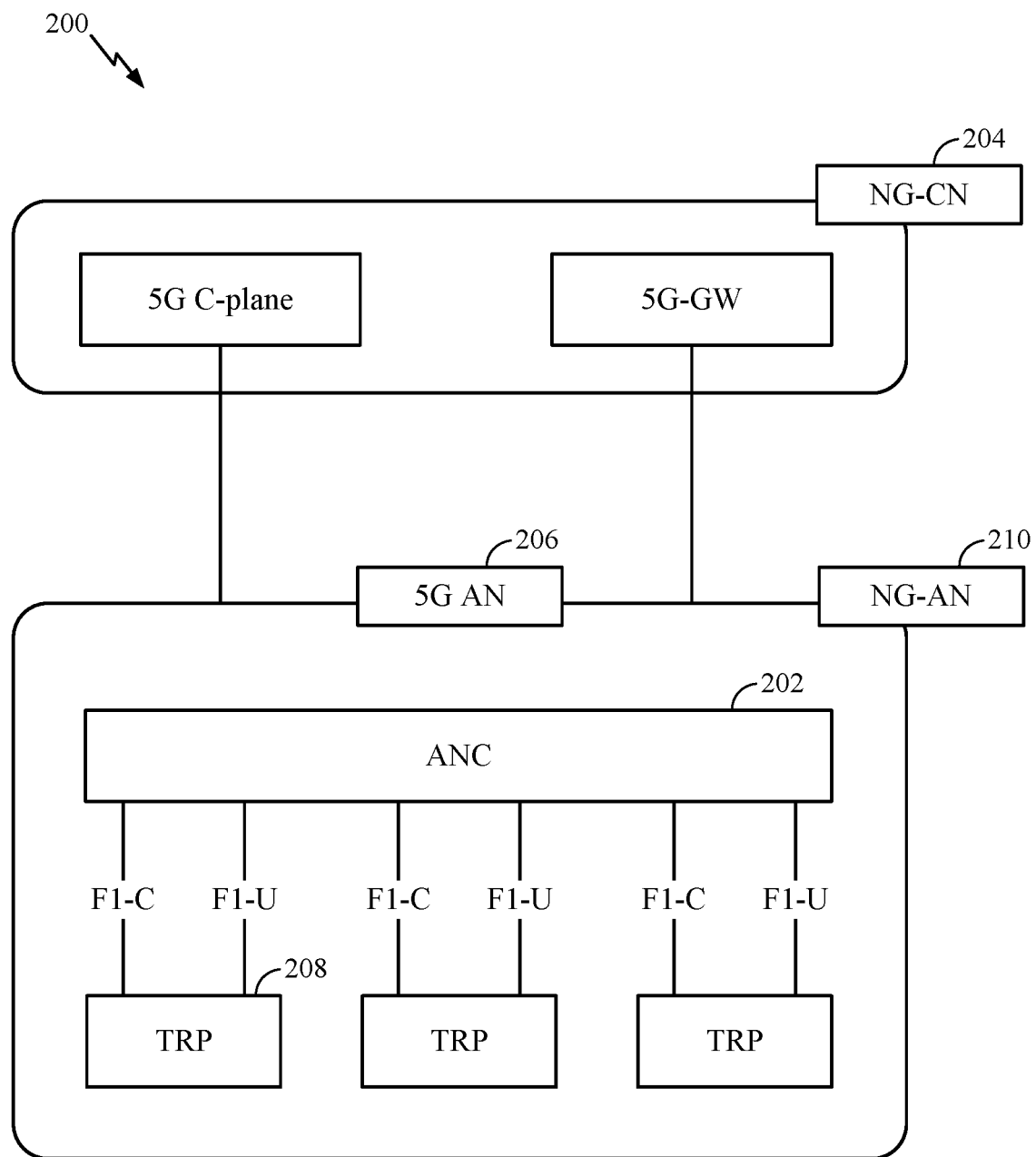
FIG. 2 is a block diagram illustrating an example logical architecture of a distributed radio access network, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
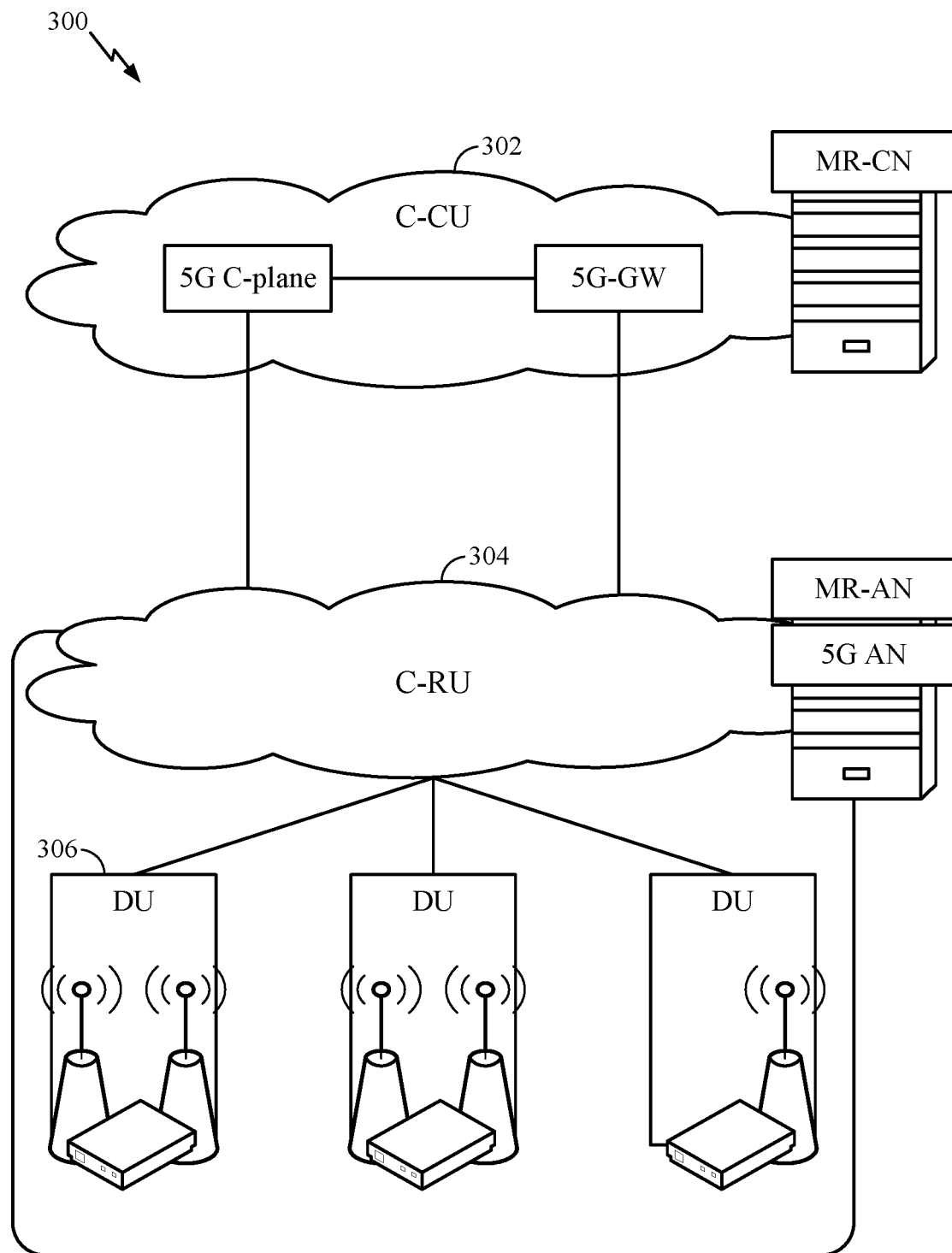
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
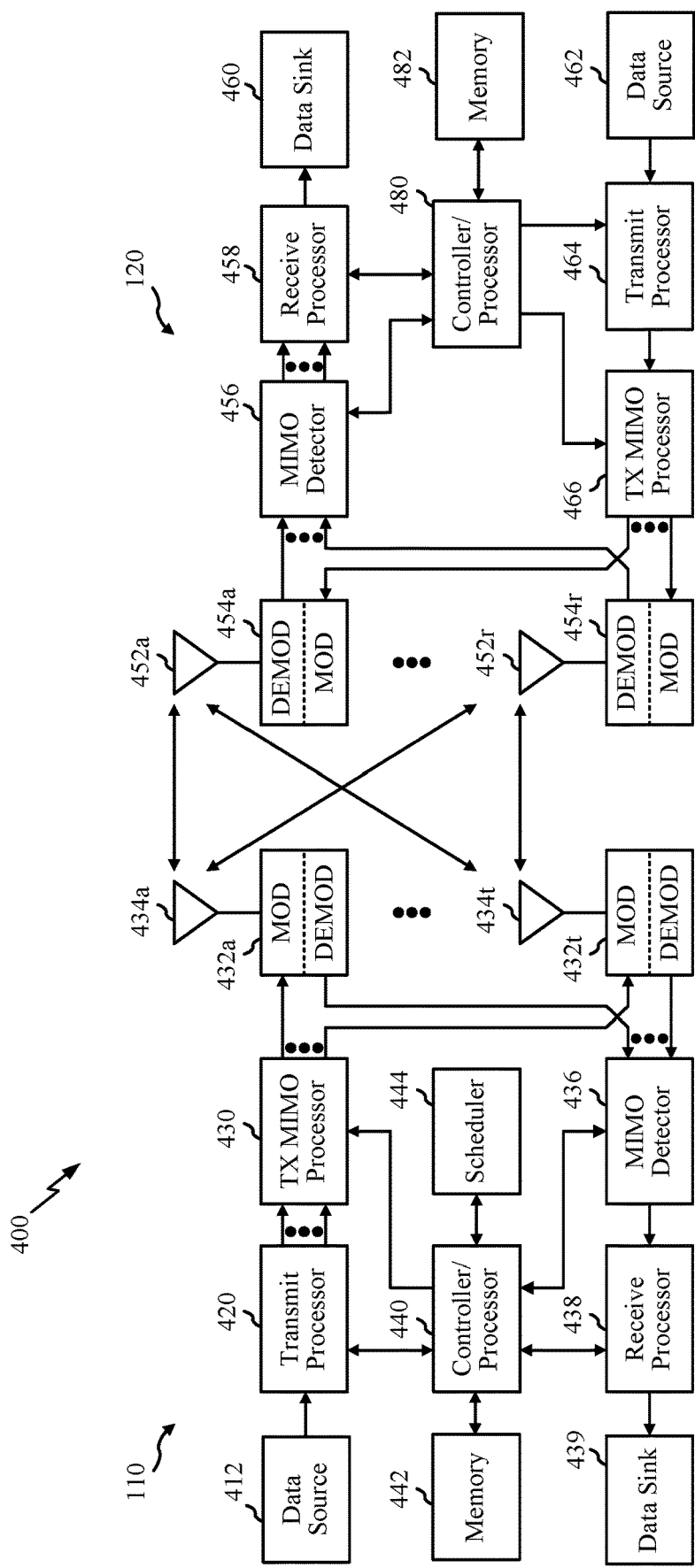
FIG. 4 is a block diagram illustrating a design of an example based station and a user equipment, in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 8-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein. The processor 480 and/or other processors and modules at the UE 120 may perform or direct, e.g., the execution of the functional blocks illustrated in FIG. 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
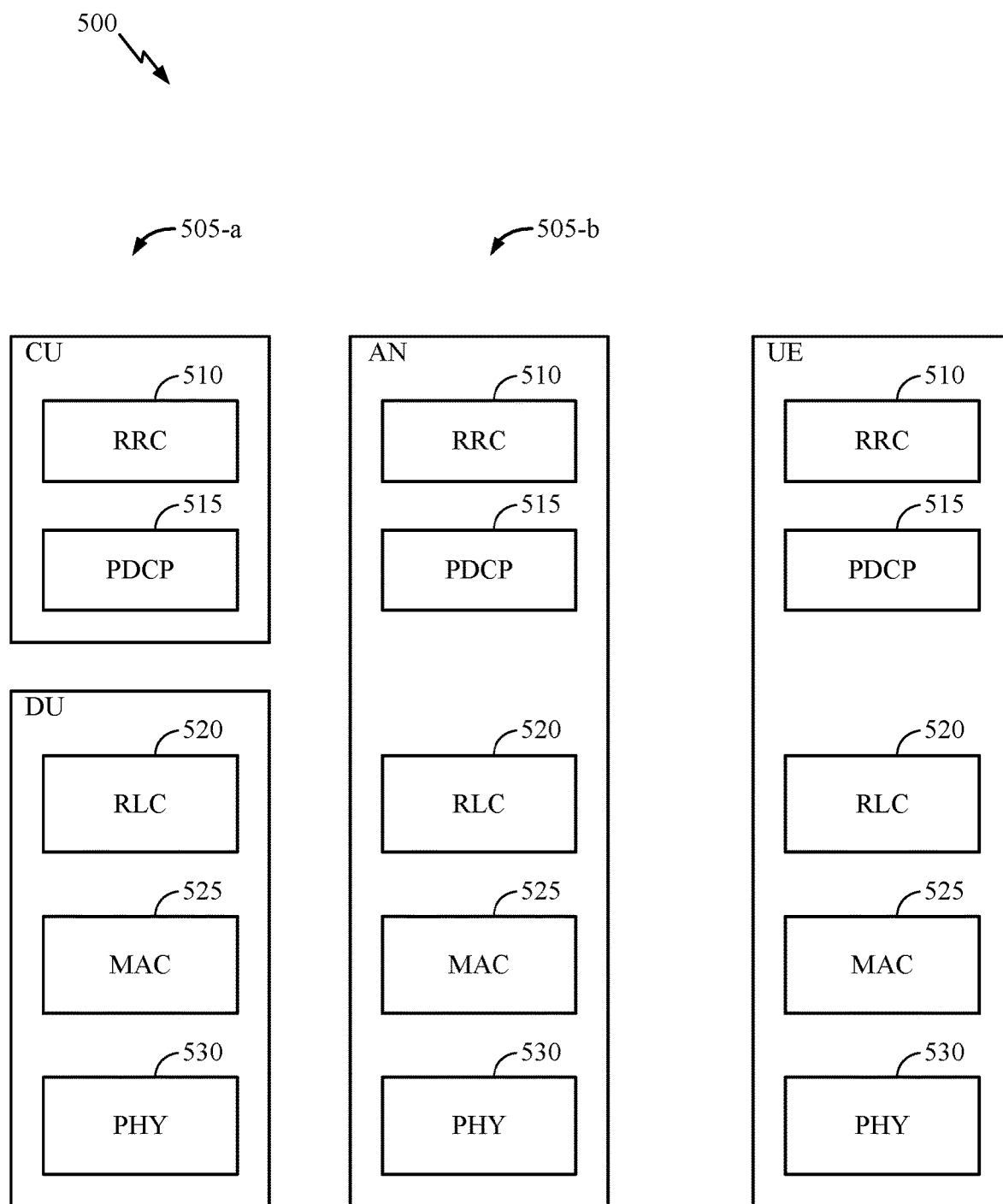
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
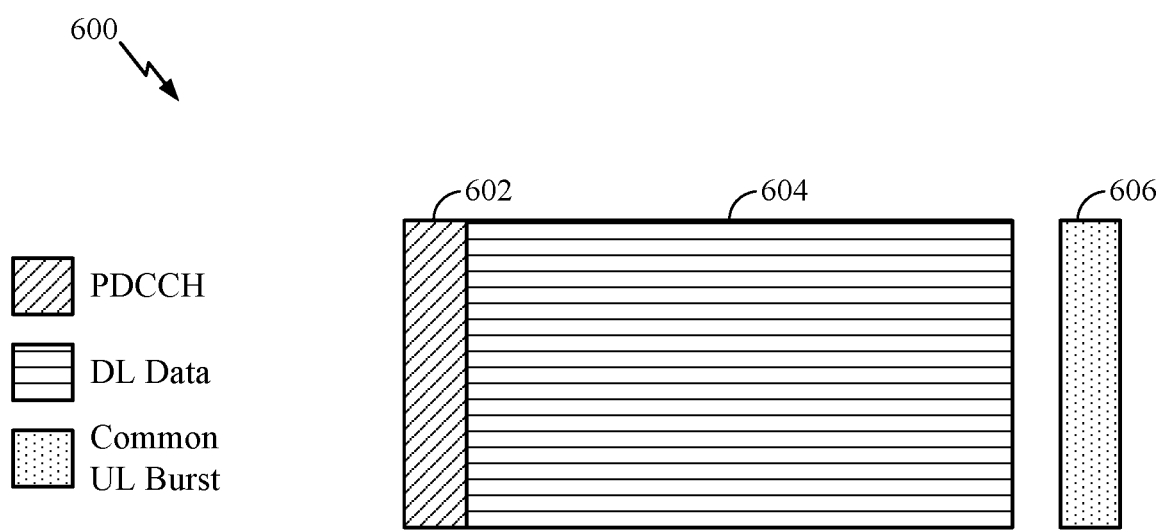
FIG. 6 illustrates an example of a downlink-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PD SCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
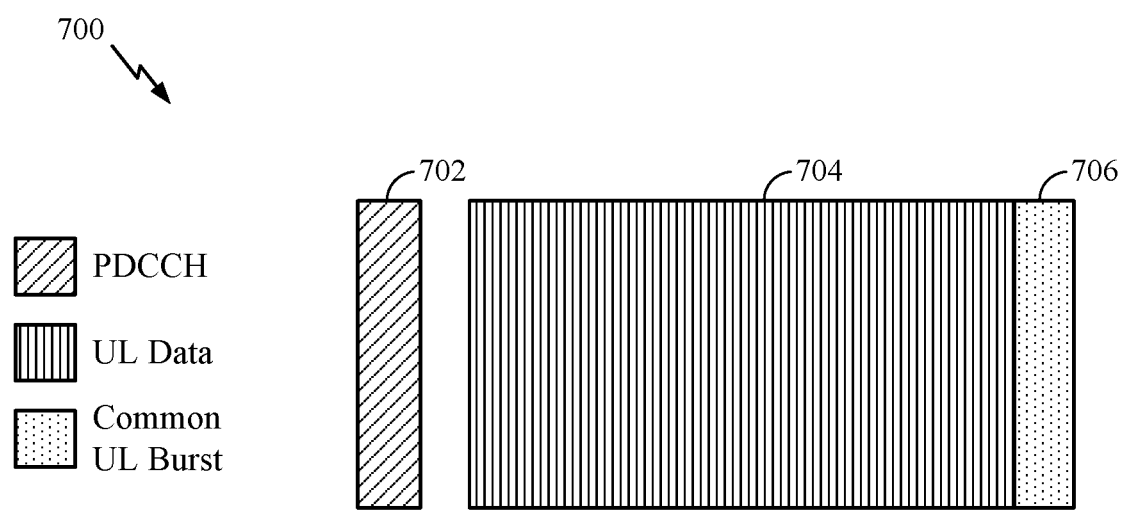
FIG. 7 illustrates an example of an uplink-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UEto-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Configurations for Shortened
Transmission Time Intervals (sTTI) for Low
Latency Communication A base station may transmit to one or more UEs using a transmission time interval (TTI) that is reduced in length. Such a TTI may be referred to as a shortened TTI (sTTI) and a user receiving a sTTI may be a low latency user. A sTTI may be divided into a number of resource blocks across a system bandwidth, and each of the resource blocks may be allocated to a UE by a base station. The base station may transmit control information or a control message in a first portion (e.g., control region) of a resource block to provide resource allocations. A low latency user may attempt to decode the control information in the resource block to determine a data region allocated within the same sTTI.

A control region may be located at the beginning of a resource block, and a UE may receive and decode the control information transmitted in the control region to determine that the data region of the resource block has been allocated for that UE.

In certain aspects, a downlink grant may be transmitted at the beginning of a control message in a control region of a sTTI, and uplink grants may be transmitted at the end of the control region. A configuration that anchors the downlink grant at the beginning of the control region, and anchors the one or more uplink grants, if any, at the end of the downlink control message, may reduce the number of blind decodes that a receiving UE needs to perform, and/or allow for the processing of the downlink grant to begin prior to the UE completing searching for uplink grants. Thus, processing time and latency may be optimized. In addition, in some cases, one or more bits may be added (e.g., to an information field) to a downlink grant to indicate a position within the control region of a sTTI for the start of the uplink grants. This indication may allow for a number of different aggregation levels to be used, while allowing for unused portions of the control region to be reallocated as part of the data region.

In certain aspects, a sTTI may include a number of resource blocks, each of which may be assigned to a low latency user. In some cases, a downlink grant, which may be included in a control message in a control region at the beginning of a resource block, may be used to indicate the allocation of the data region of that resource block to a particular user. A number of bits corresponding to the number of other resource blocks (e.g., the total number of resource blocks of the sTTI minus one) may be added to the downlink grant to indicate whether the downlink grant may also be subsequent resource blocks in the sTTI. As such, control channel overhead may be reduced by reducing a total number of downlink grants, while minorly changing the total size of each downlink grant.

In certain aspects, a base station (e.g., base station 110 of FIG. 1) may transmit resource allocations and other control information in one or more shortened PDCCH (sPDCCH) transmissions to the UE (e.g., UE 120 of FIG. 1). The resource allocations may include one or both of downlink grants and uplink grants of resources for transmission of downlink data (e.g., in a shortened PDSCH, sPDSCH) and uplink data (e.g., in a shortened PUSCH, sPUSCH) respectively for the UE 120.

A sTTI for low latency communications may have multiple resource blocks, which may span the whole system bandwidth or a portion of the system bandwidth. The resource blocks may have the same or different sizes in frequency domain. Each resource block may be allocated for a single user or multiple users. The users may access one, multiple, or all of the resource blocks of the sTTI, depending on their configuration. The resource block structure used may be defined by higher level signaling, for example, for a semi-static configuration.

A resource block in a sTTI may have a sPDCCH associated with the resource block. The sPDCCH may be embedded in the resource block. The sPDCCH may be at the beginning of the resource block (e.g., in the first one or more symbols of the resource block) to enable early decoding of the sPDCCH in the resource block. The sPDCCH may span the bandwidth of the resource block, or may occupy less than the full bandwidth of the resource block, with additional signaling included above (e.g., at a higher frequency) and/or below (e.g., at a lower frequency) the resource elements occupied by the sPDCCH in the resource block. In some cases, a sPDCCH may allocate a sPDSCH to a low latency user for a resource block.

In certain aspects, a sPDCCH for one resource block within a sTTI for a user may include a downlink grant for one or more additional resource blocks within the sTTI for the same user. For example, as described above, the sPDCCH may be in the first portion of the sTTI block (e.g., in the first symbol of the sTTI) at a predefined location within the resource block of the sTTI. A low latency user may monitor the control region (e.g., the sPDCCH) for each sTTI resource blocks to determine whether a downlink grant of resources has been sent (e.g., from a serving base station 110) in the sPDCCH to the low latency user. A low latency user may search for both uplink and downlink grants in the sPDCCH.

As described above, a sPDCCH may be positioned at the beginning of a resource block of a sTTI. In addition, a downlink grant of the sPDCCH may be positioned at the beginning of the sPDCCH. By providing the downlink grant for a low latency user in a same position of each sPDCCH, a search space for the low latency user may be reduced. In some examples, if a low latency user searches for a control message (e.g., for a downlink grant of resources) for that user in a sPDCCH, and successfully identifies the presence of a downlink grant, the low latency user may infer that the associated sPDSCH of that resource block is allocated for that low latency user. Thus, the low latency user may efficiently identify the sPDSCH allocated to itself.

In certain aspects, the downlink grant may include one or more bits that point to other resource blocks of the sTTI comprising a sPDSCH, for that same low latency user. In some cases, the one or more bits may include resource assignment information. Each of the one or more bits may indicate whether or not a resource block is allocated for the same low latency user. For example, if a sTTI includes three resource blocks, two downlink grant bits in a sPDSCH of one resource block may be used to indicate whether the downlink grant is for any of the other three resource blocks for the low latency user.

In certain aspects, downlink grants in other resource blocks may be for one or more other low latency users, and may likewise indicate that the sPDSCH in the resource block containing the sPDCCH with the downlink grant is for one or more of the other low latency users, and one or more bits (e.g., two bits for three resource blocks) may be used to indicate whether any of the other resource blocks are for one or more of the other low latency users. The bits may be appropriately indexed and the resource block to which they relate may be based on a position of the resource block in which the one or more bits of the downlink grant appear. The above-described procedure may efficiently indicate downlink grants, at least in part, because a low latency user may only need to perform a blind decode in a fixed position of the sPDCCH within the resource block, and a number of blind decodes used to determine the downlink grant may be limited to a number of resource blocks configured by a base station in the sTTI.

The uplink grants of a sPDCCH already containing a downlink grant may be separated from the downlink grants. For example, the downlink grants may be transmitted at the beginning of the sPDCCH control region, and the uplink grants may be sent at the end of the sPDCCH control region. As used herein, the sPDCCH control region may be a virtual control region, for example meaning that the resource elements of the sPDCCH may not all be adjacent in the time-frequency domain. The downlink and uplink grants of a sPDCCH may be separated at least in part so that the downlink and uplink grant search spaces do not overlap. Providing the downlink grant at a fixed position relative to a boundary of the sPDCCH control region, and uplink grants at a fixed position relative to another boundary of the sPDCCH control region may reduce the number of blind decode attempts for a low latency user. In addition, because a downlink grant may be received at a set or predetermined position that is separated from a search space for the one or more uplink grants, UE 120 may begin to decode the downlink grant prior to completing a blind decoding process for the uplink grants. In some cases, downlink grant processing and uplink grant blind decoding may proceed in parallel, thus increasing efficiency by decreasing the amount of time needed for the UE 120 to receive and process a sPDCCH.

A position of each of the uplink grants to be transmitted in a sPDCCH may be determined by the base station 110 based at least in part on the uplink grant aggregation level. As described above, the base station 110 may transmit an indication of the uplink grant aggregation level to a low latency user in a prior grant message. The base station 110 may statically define uplink grant locations for each of multiple aggregation levels. In other examples, multiple uplink grant locations may be defined for a particular aggregation level. Multiple uplink grant locations may result in a greater number of blind decoding attempts by the UE 120, since there are an increased number of potential uplink grant locations for the UE 120.

In some examples, the size of the sPDCCH control region may be at least large enough to accommodate a nominal level of grants and aggregation levels without overlap of the downlink grants and uplink grants at the various aggregation levels. As such, a portion of the sPDCCH control region may be unused. The size of the unused portion of the sPDCCH control region may depend on a number of uplink grants and the aggregation level for a particular sPDCCH. This unused sPDCCH control region may be repurposed by including an indication in the downlink grant of the sPDCCH (e.g., a sPDCCH rate matching information field) that indicates the start of the uplink grants in the sPDCCH. The UE 120 that holds the downlink grant may rate match the sPDSCH data region around the downlink grant and uplink grants, if any, to use this otherwise unallocated portion of the sPDCCH as an additional portion of the sPDSCH. The size of this indicator may provide the number of available positions to start the uplink grants in the sPDCCH. For example, where the indictor includes three bits, one of eight possible positions for the start of the uplink grants may be indicated.

Figure 8:
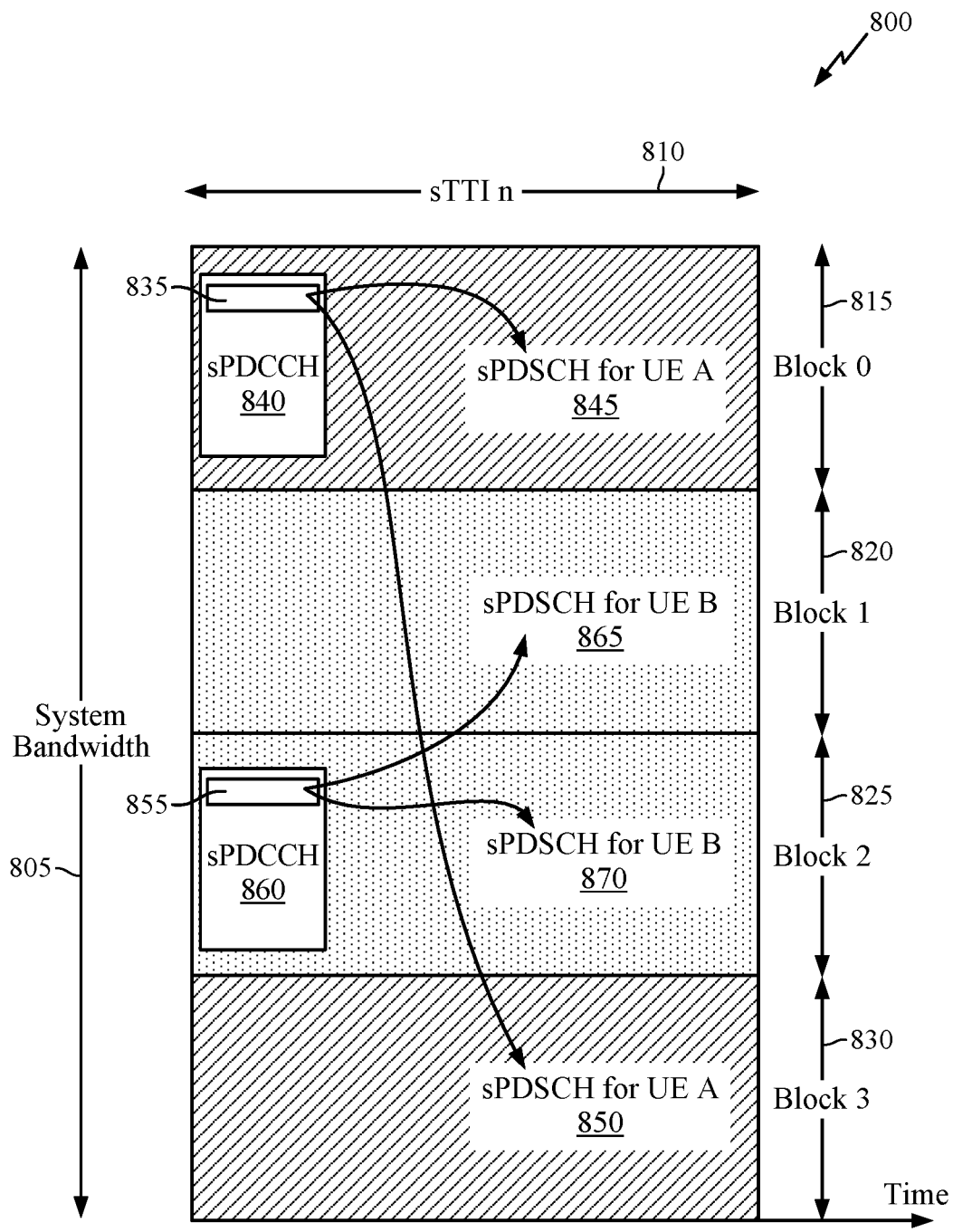
FIG. 8 illustrates an example of a resource allocation for low latency applications, in accordance with certain aspects of the present disclosure

FIG. 8 illustrates an example of a resource allocation diagram 800 for low latency applications, in accordance with certain aspects of the present disclosure. Resource allocation diagram 800 may include sTTI 810 occupying a system bandwidth 805. In some cases, the sTTI 810 may represent a sTTI within a legacy TTI, or a separate TTI. In some examples, and as may be the case with other sTTIs described here, sTTI 810 may be of different durations. For example, in some cases, sTTI 810 may be spread over a two symbol periods, or a single slot width associated with a legacy TTI, or another time period. In this example, sTTI 810 includes four resource blocks: resource block 815 and resource block 830 for UE A, and resource block 820 and resource block 825 for UE B.

A base station (e.g., base station 110 of FIG. 1) may generate a downlink grant 835 to be included in a sPDCCH 840, in the control region of resource block 815. In an aspect, for a two symbol sTTI, the control region of a resource block is allocated within the first symbol duration of the sTTI. Further, an sPDCCH region within an sTTI resource block may be communicated to UEs via RRC signaling. The downlink grant 835 may be for sPDSCH 845 of the resource block 815. In some cases, the sPDSCH 845 may be in a first symbol period of the resource block 815. In some cases, the downlink grant 835 may be in a data region of the resource block 815. The downlink grant may also be for a second sPDSCH, sPDSCH 850, in a data region of resource block 830 that are also for UE A, to be jointly used to receive data at UE A based on the control information of downlink grant 835.

A base station may also generate a second downlink grant 855 to be included in an sPDCCH 860, in the control region of resource block 825. The downlink grant 855 may be for the sPDSCH 870 of the resource block 825, and may also be for the sPDSCH for resource block 820.

For both downlink grants, one or more bits in each of downlink grant 835 and downlink grant 855 may be generated by a base station to indicate other resource blocks of the sTTI that include a sPDSCH for that same low latency user. In this example, sTTI 810 includes four resource blocks. Downlink grant 835 for the UE A may thus include three bits to indicate whether the downlink grant 835 is for any of the other three resource blocks for the UE A.

In one example, the bits of the indication may make up or be a part of a resource allocation field in the downlink grant 835. In other examples, the bits of the indication may be included at another position in a sPDCCH, such as sPDCCH 840, or elsewhere within the control region of a resource block, such as resource block 815. The first bit of the indication may be associated with resource block 820, the second bit may be associated with resource block 825, and the third bit may be associated with resource block 830. The receiving UEs, UE A and UE B may infer the relationship between the bits and the resource blocks. For example, the first bit may be associated with the first resource block of the sTTI 810 that does not contain the downlink grant having the bits of the indication, and so on. In the example shown in resource allocation diagram 800 with respect to sTTI 810, in downlink grant 835, the third bit of the indication may identify the fourth resource block 830 as for UE A. In downlink grant 855, the second bit of the indication may identify the second resource block 820 as for UE B.

The above-described configuration may efficiently indicate downlink grants at least in part because a low latency user may only need to perform a blind decode in a fixed position of the sPDCCH within the resource block, and a number of blind decodes used to determine the downlink grant may be limited to a number of resource blocks configured by a base station (e.g., cell) in the sTTI. Furthermore, the maximum number of bits in the indication of the downlink grant may also be limited to the number of resource blocks of the sTTI minus one.

Figure 9A:
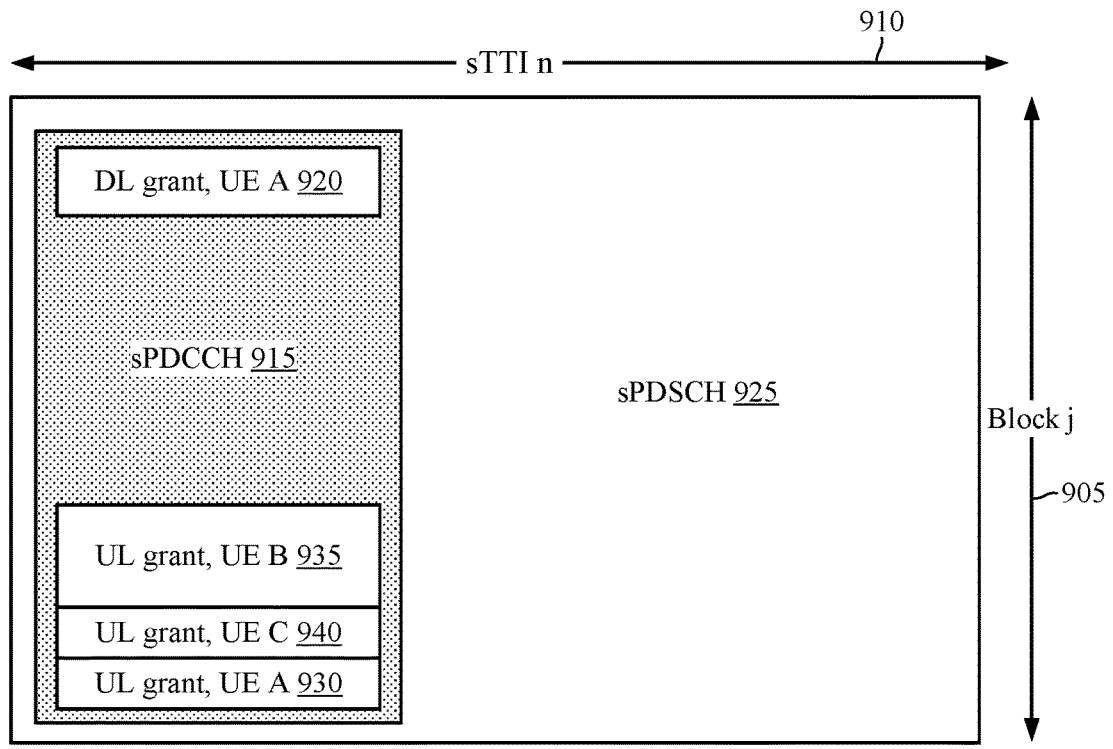
FIGS. 9A and 9B illustrate example resource allocations for low latency applications, in accordance with certain aspects of the present disclosure.
Figure 9B:
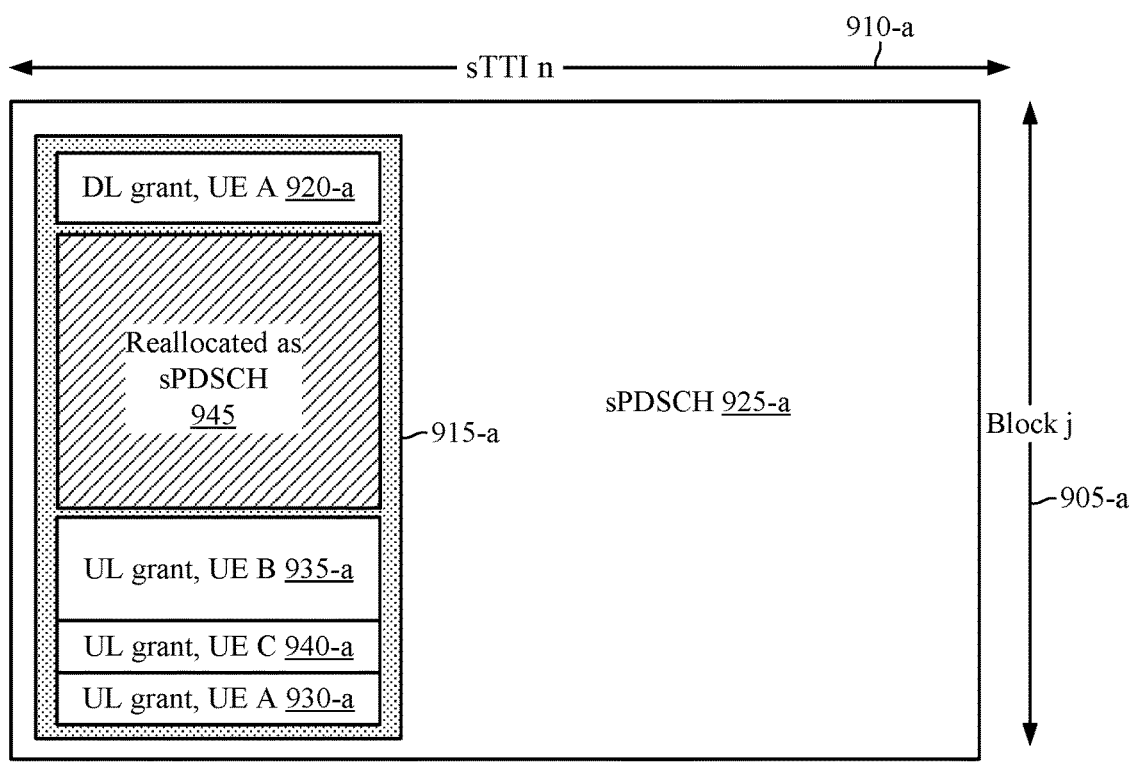

FIGS. 9A and 9B illustrate examples of resource allocation diagrams 901 and 902 for low latency applications, in accordance with certain aspects of the present disclosure.

Each of resource allocation diagrams 901 and 902 show a resource block 905 for a sTTI 910, where the resource block 905 includes a control region including sPDCCH 915 and a data region including sPDSCH 925 for UE A that is indicated by sPDCCH 915. In some cases, sPDCCH 915 may comprise or include one or more aspects of sPDCCH 840 and sPDCCH 860. Furthermore, in some cases, sPDCCH 915 may include at least one downlink grant 920 for the UE A. Some examples of a sPDCCH 915 may include one more uplink grants for one or more UEs, which may also include an uplink grant for the UE A. In some examples, resource allocation diagrams 901 and 902 may include uplink grant 930 for UE A, or uplink grant 935 for UE B, or uplink grant 940 for UE C, or a combination thereof.

As illustrated in resource allocation diagrams 901 and 902, a downlink grant 920 may be at the beginning of the sPDCCH 915, for example, at a position at a first boundary of the sPDCCH 915 control region. In some cases, the uplink grants may be clustered at the end of the control region, sPDCCH 915. The uplink grants may be transmitted by a base station in sPDCCH 915 of resource block 905 according to one of multiple different aggregation levels for UE A. In some examples, the aggregation level for UE A may have been indicated in a previously transmitted grant from base station. For example, a two-stage grant configuration may be used, such that the first grant in a previous transmission (e.g., a previous sTTI or TTI, such as a PDCCH in a previously-received TTI) may include the aggregation level for UE A, and the second grant may be the downlink grant 920. The uplink grant 930, uplink grant 935, and uplink grant 940 may be at the end of sPDCCH 915, with the uplink grant 930 for UE A at the end of sPDCCH 915 and located at a position at a second boundary of the sPDCCH 915 control region. In some cases, as depicted, uplink grant 935 and uplink grant 940 may be at positions adjacent to the uplink grant 930 for the UE A. In some cases, the span of sPDCCH 915 may be wide enough such that for any aggregation level that can be indicated for the UE A, the downlink grant 920 and multiple uplink grants may not overlap if the downlink grant 920 is at the beginning of sPDCCH 915 and the uplink grant(s) are positioned at the end of sPDCCH 915.

The configuration of downlink grants at the beginning of sPDCCH 915 and uplink grants at the end of sPDCCH 915, may reduce the number of blind decoding attempts for a particular UE. For example, one downlink grant for the particular UE may be at the beginning of sPDCCH 915. If an attempted blind decode at the beginning of sPDCCH is unsuccessful, the UE may deduce that the sPDSCH 925 is not for that particular UE.

As illustrated in resource allocation diagram 902, a portion of the control region for sPDCCH 915 may be reallocated to be a part of data region for sPDSCH 925, thus recapturing unused control overhead from sPDCCH 915. Thus, reallocated sPDSCH 945 may be relocated from a portion of the sPDCCH 915-a between downlink grant 920-a and the uplink grants, specifically an uplink grant 935-a for UE B. The size of reallocated sPDSCH 945 may depend in part on the aggregation level. The resources of sPDCCH 915-a that are to be used for reallocated sPDSCH 945 may be signaled in the downlink grant 920-a. In particular, an indication may identify the start of the uplink grant region, which may include uplink grant 930-a, uplink grant 935-a, and uplink grant 940-a for sPDCCH 915-a. In some examples, the indication may be rate matching information field, as further described below.

Power Control for Short TTI (sTTI) PUSCH

Aspects of the present disclosure provide techniques for power control for short transmission time interval (sTTI) physical uplink shared channel (PUSCH) transmissions. The techniques may be applied in certain scenarios, such as when a UE is triggered to report aperiodic channel state information (A-CSI) in a PUSCH with no uplink data.

Information in a CSI report generally includes information that indicates the state of a channel. Typically, the CSI report has one or more of CQI (Channel Quality Indicator), PMI (Precoding Matrix Index), and RI (Rank Indicator). The number of (payload) bits available for CQI and/or PMI may vary, depending on rank. Typically, A-CSI reports are provided via PUSCH, while periodic CSI reports may be provided via PUSCH or PUCCH.

There are certain scenarios where the use of sTTIs presents a challenge to UEs in terms of processing timelines. One example of such a challenge is when the UE is to report an aperiodic channel state information (A-CSI) report without UL data.

In some examples, when an UL grant triggers an A-CSI report without UL data, the payload of the CSI report can impact the UL PUSCH power computation. This impact can be in terms of a bits per resource element (BPRE) parameter. This dependency can be due to a power adjustment term, $\Delta_{TF}$, applied to PUSCH transmissions. This power adjustment term, $\Delta_{TF}$, may be dependent on a BPRE parameter as follows:

$\Delta_{TF,c}(i)=10\log_{10}((2^{BPRE \cdot K_s}-1) \cdot \beta_{offset}^{PUSCH})$ for $K_S=1.25$ and $K_S=0$ where $K_S$ is given by the parameter delta-MCS-Enabled provided by higher layers for each serving cell c . . . .

BPRE=$O_{CQI}/N_{RE}$ for control data sent via PUSCH without UL-SCH data, where $N_{RE}$ is the number of resource elements and $O_{CQI}$ could be the number of actual CQI bits or could be independent of the actual number of CQI bits (as shown in FIG. 14).

Because the number of CQI bits ($O_{CQI}$) impacts conventional sTTI UL PUSCH power computation, the CSI computation should be completed before the UL transmit power can be calculated. However, given the short processing time available for the UE under short transmission time interval (sTTI) operation, the UE may not be able to complete the CSI computation in time to then calculate the UL transmit power while still satisfying the shorter response time requirements of sTTI operation.

Aspects of the present disclosure help a UE solve this problem associated with the short processing time available for the UE under sTTI operation, by making the computation for CSI reporting and UL power calculation independent of each other. In one aspect, UL power calculation is independent of the actual number of CQI/PMI bits to send in an A-CSI report and can be performed concurrently with CSI processing. This approach allows the UE to calculate UL transmit power without having to wait until the full CSI payload is known, which may allow the UE to be able to apply the UL power adjustment and still meet the stringent timing requirements of sTTI based A-CSI reporting. One example of the present techniques which illustrates this decoupling (also shown in FIG. 14) is as follows:

$\Delta_{TF,c}(i)=10\log_{10}((2^{BPRE \cdot K_s}-1) \cdot \beta_{offset}^{PUSCH})$ for $K_S=1.25$ and $K_S=0$ where $K_S$ is given by the parameter delta-MCS-Enabled provided by higher layers for each serving cell c. BPRE and $\beta_{offset}^{PUSCH}$, for each serving cell c, are computed as below. $K_S=0$ for transmission mode 2.

BPRE=$O_{CQI}/N_{RE}$ for control data sent via subframe-PUSCH without UL-SCH data or slot/sublot-PUSCH without UL-SCH data if the UE is configured with a higher layer parameter uplinkPower-CSIPayload. BPRE=$O'_{CQI}/N_{RE}$ and $O'_{CQI}=\max\{O_{CQI,RI}\}$ with $O_{CQI,RI}$ defined as the number of CQI/PMI bits including CRC for a given RI value for slot/subslot-PUSCH without UL-SCH data if the UE is not configured with a higher layer parameter uplinkPower-CSIPayload.

$$BPRE = \sum_{r=0}^{C-1} K_r/N_{RE}$$

for other cases.

Techniques described herein enable UL power calculation before CSI computation is complete. These techniques may be performed by a UE, for example, after receiving a grant requesting (triggering) the UE to perform A-CSI reporting. The (UL) grant may be without UL data, such as an UL grant with A-CSI trigger but no RB allocation, or an UL grant with A-CSI trigger and RB allocation but when the UE has no data to send. The A-CSI may have a payload based on the size and type of information to report, wherein payload refers to a number of bits of CSI.

Figure 10:
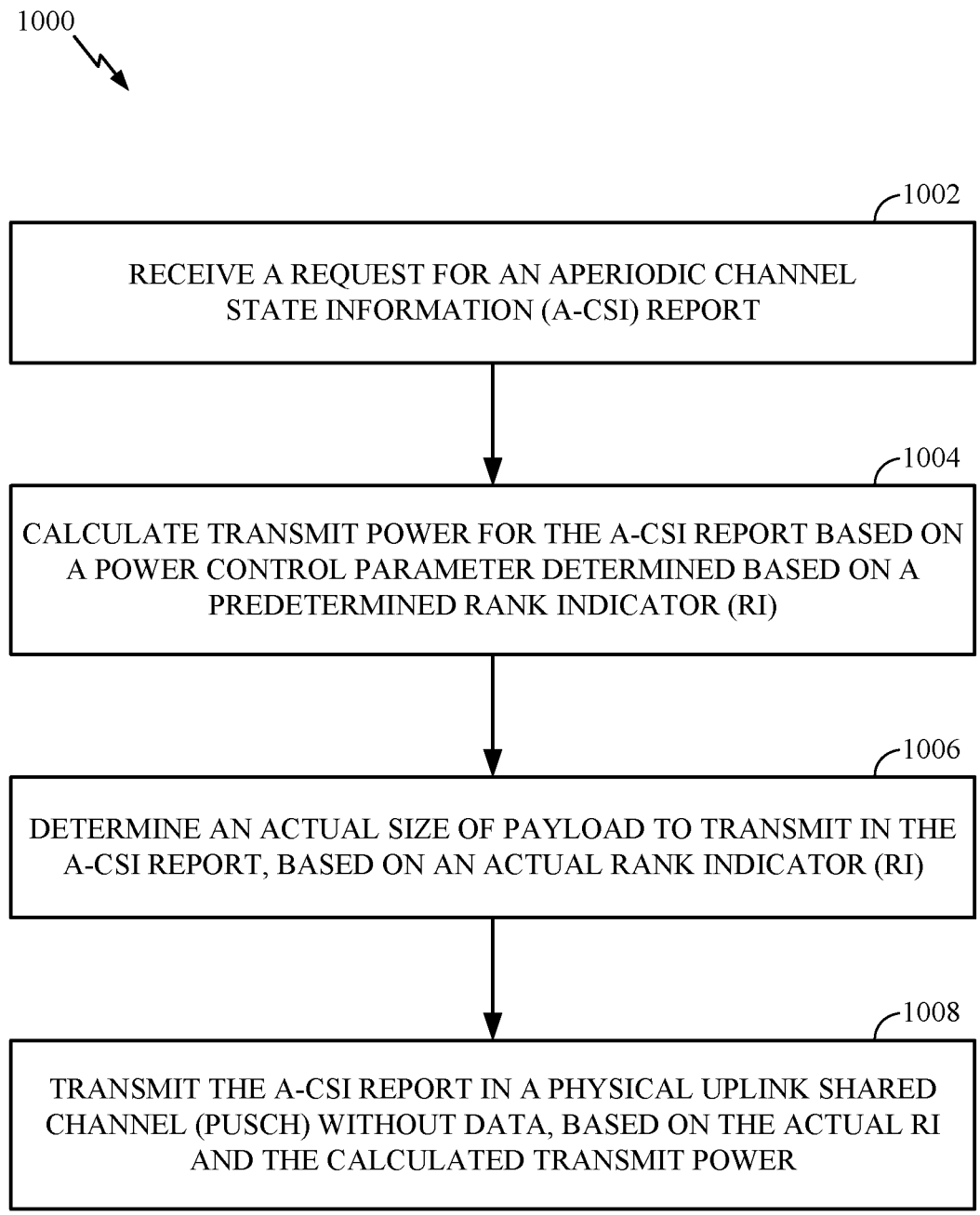
FIG. 10 illustrates example operations performed by a user equipment, in accordance with certain aspects of the present disclosure.

FIG. 10 illustrates example operations 1000 for sTTI PUSCH power control, in accordance with certain aspects of the present disclosure. Operations 1000 may be performed, for example, by a UE 120 shown in FIG. 1.

Operations 1000 begin, at 1002, by receiving a request for an aperiodic channel state information (A-CSI) report. At 1004, the UE calculates transmit power for the A-CSI report based on a power control parameter. Rather than waiting for the actual RI value to be determined, in some aspects, the power control calculation may proceed based on a fixed or predetermined RI value.

Use of the fixed or predetermined RI value in connection with UL power control (as opposed to using the actual RI value resulting from CSI computation) may be signaled as part of an RRC configuration. In some aspects, use of the fixed or predetermined RI value may be based on a UE capabilities reported to the network.

When it is determined to use the fixed or predetermined RI, in some examples, the UE may determine a corresponding number of CQI bits ($O_{CQI}$) and derive the BPRE parameter. The number of CQI bits may, for example, correspond to a maximum number of CQI bits for a given RI value. The UE may then use the number of CQI bits to determine BPRE under the fixed or predetermined RI assumption and may UL transmit power on that basis (e.g., as shown in FIG. 11).

At 1006, the UE performs CSI computation and determines an actual size of payload to transmit in the A-CSI report, based on an actual rank indicator (RI). The determination of the actual RI and CSI payload size may be performed independently of determining UL transmit power to accommodate processing time available with sTTI operation.

At 1008, the UE transmits the A-CSI report in a physical uplink shared channel (PUSCH) without data, with the actual RI and the UL transmit power calculated under the fixed or predetermined RI assumption.

By effectively making BPRE independent of the actual number of CQI bits, the transmit power calculation (involving the adjustment $\Delta TF$) is also made independent of the actual number of CQI bits.

In some cases, a UE capability to support BPRE derivation based on either an actual number of CQI bits, OCQI, or on OCQI derived with a predetermined/preconfigured RI assumption (e.g., RI=1, RI=2, etc.) may be defined. For example, the RI could be any fixed and/or predetermined value between 1 and 4 (e.g., corresponding to a maximum number of layers for sTTI operation).

In some cases, the value of RI could be configurable for a UE. In other words, according to the present disclosure, a UE may perform transmit power processing and CQI processing in parallel. The transmit power processing may be performed (based on a preconfigured RI) before the actual CSI payload size is known, while the CQI may be transmitted (as UCI in a PUSCH) with the actual payload size (i.e., based on the actual RI), but with the transmit power calculated based on the preconfigured RI. In some cases, the UE may use the predetermined RI or the actual RI depending on the TTI length associated with the A-CSI report (e.g. use predetermined RI for sub-slot TTI and actual RI for 1 ms TTI).

FIG. 11 illustrates an example of calculating certain power control parameters, in accordance with aspects of the present disclosure.

As illustrated in FIG. 11, in some cases, a new RRC parameter (e.g., uplinkPower-CSIPayload), may be defined to configure a UE to derive BPRE based on either the actual value of OCQI or the OCQI derived with under a fixed or predetermined RI assumption (e.g., RI=1).

Figure 12:
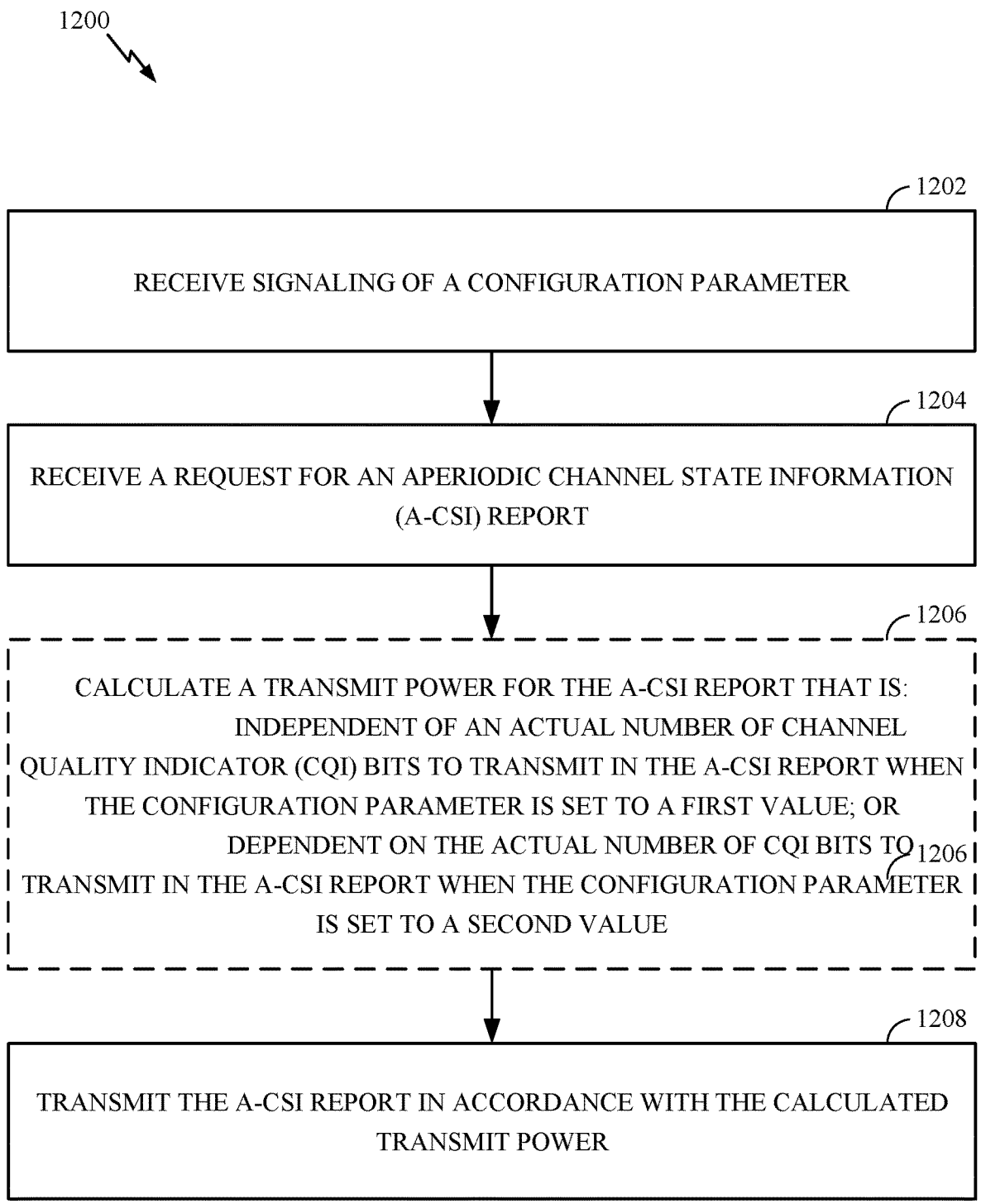
FIG. 12 illustrates example operations performed by a user equipment, in accordance with certain aspects of the present disclosure.

FIG. 12 illustrates example operations 1200 for sTTI PUSCH power control, in accordance with certain aspects of the present disclosure. Operations 1200 may be performed, for example, by a UE 120 shown in FIG. 1.

Operations 1200 begin, at 1202, by receiving signaling of a configuration parameter. For example, the configuration parameter may be uplinkPower-CSIPayload that determines how a UE calculates transmit power for an A-CSI report (e.g., in the manner shown in FIG. 14).

At 1204, the UE receives a request for an aperiodic channel state information (A-CSI) report. At 1206, the UE calculates a transmit power for the A-CSI report that is: a) independent of an actual number of channel quality indicator (CQI) bits to transmit in the A-CSI report when the configuration parameter is set to a first value or b) dependent on the actual number of CQI bits to transmit in the A-CSI report when the configuration parameter is set to a second value.

For example, the UE may determine transmit power based on an equation for ΔTF, which includes a BPRE component. In order to determine the transmit power independently of the actual number of CQI (and PMI) bits, an alternative option to that described with respect to FIG. 10 is to assume an RI associated with a maximum number of CQI/PMI bits from available RI values, which may be referred to as a "worst case" scenario. For example, rather than calculating the BPRE based on the actual number of CQI/PMI bits, a RI associated with a largest number of CQI/PMI bits is used to derive BPRE. Preferably, BPRE is defined based on the maximum number of CQI/PMI bits including CRC over all RI values. This approach may allow a UE to calculate transmit power for the A-CSI report independent of the actual number of CQI/PMI payload bits, which may allow the UE to satisfy stringent timelines for shortened TTI operation. At 1208, the UE transmits the A-CSI report in accordance with the calculated transmit power.

In some cases, a UE capability to support ΔTF calculation for sTTI based on either the configuration of deltaMCS-Enbaled parameter (e.g., the same or similar to a conventional legacy LTE approach) or a value Ks=0 may be defined. In some cases, a deltaMCS-Enabled parameter can be configured separately for 1 ms TTI operation and sTTI operation. For a non-capable UE, Ks may be fixed at 0 hence, in such cases, the power adjustment ΔTF,c(i) may also be equal to 0.

Figure 13:
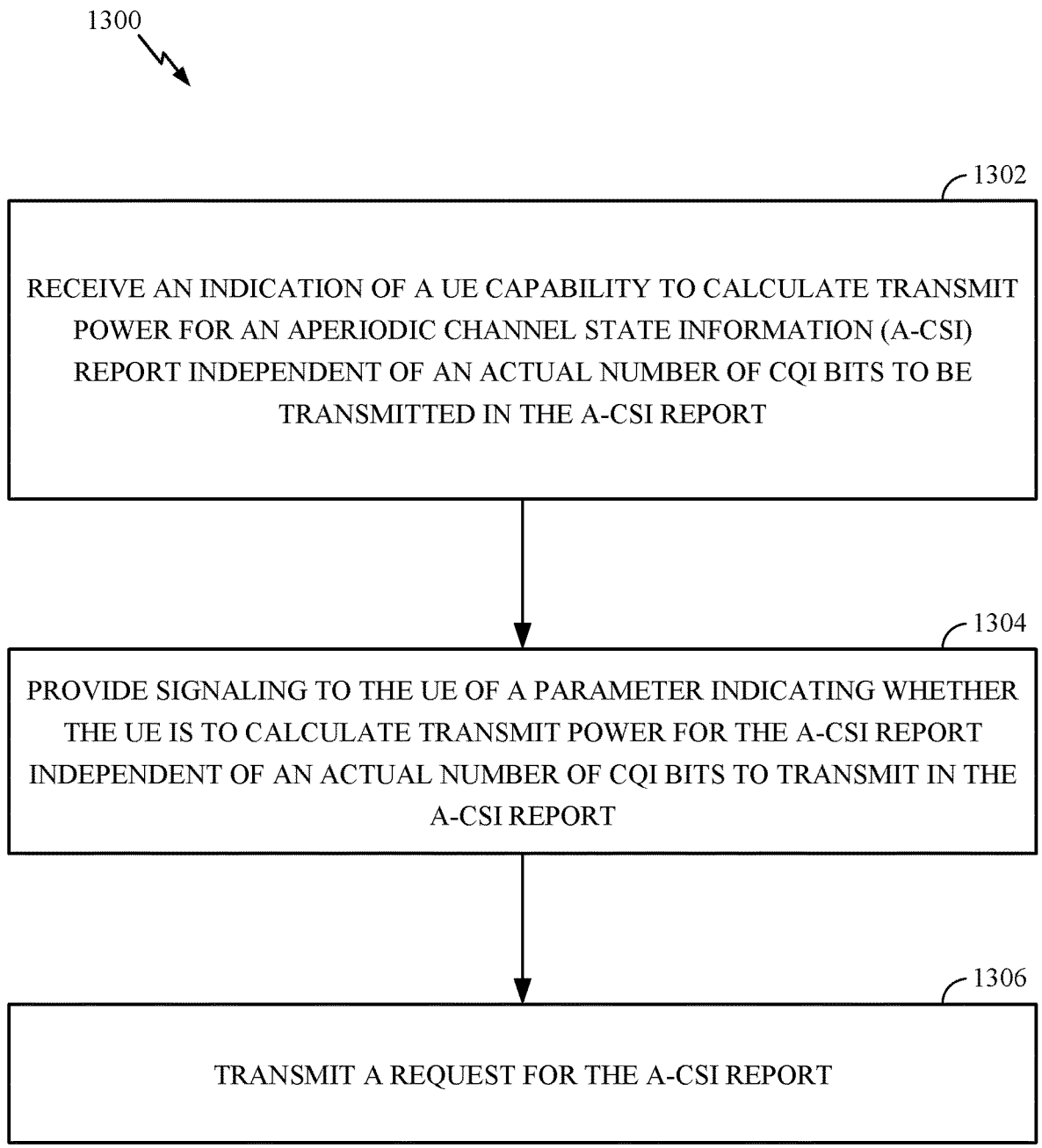
FIG. 13 illustrates example operations performed by a network entity, in accordance with certain aspects of the present disclosure.

FIG. 13 illustrates example operations 1300 performed by a network entity, in accordance with certain aspects of the present disclosure. Operations 1300 may be performed, for example, by a BS 110 shown in FIG. 1 to configure a UE to perform sTTI PUSCH power control according to operations 1200 of FIG. 12.

Operations 1300 begin, at 1302, by receiving an indication of a UE capability to calculate transmit power for an aperiodic channel state information (A-CSI) report independent of an actual number of CQI bits to be transmitted in the A-CSI report. At 1304, the network entity signals a parameter (e.g., uplinkPower-CSIPayload) to the UE indicating whether the UE is to calculate transmit power for an aperiodic channel state information (A-CSI) report independent of an actual number of CQI bits to be transmitted in the A-CSI report (or based on an actual number of CQI bits). At 1306, the network entity transmits a request for the A-CSI report.

FIG. 14 illustrates an example of selectively calculating certain UL transmit power control parameters independently of an actual number of CQI/PMI bits to be sent in an A-CSI report. The UL transmit power calculation shown in FIG. 14 may be based on a UE capability, in accordance with aspects of the present disclosure.

As illustrated, in some cases, a UE capability to support BPRE derivation based on the actual $O_{CQI}$ or a worst-case $O_{CQI}$ may be defined. In some cases, an RRC parameter referred to in FIG. 13 as uplinkPower-CSIPayload may be defined to configure a UE to derive BPRE based on either the actual value of OCQI or the worst case OCQI (e.g., OCQI corresponding to a maximum number of bits) for all RI values.

In some cases, the worst-case OCQI may depend on transmission parameters associated with a PDSCH, such as maximum number of layers, transmission mode and the like. In some cases, the UE may derive BPRE based on the worst-case OCQI for all RI values without the need for capability signaling and/or RRC parameter configuration. In some cases, the UE may use the predetermined RI or the actual RI depending on the TTI length associated with the A-CSI report (e.g. use predetermined RI for sub-slot TTI and actual RI for 1 ms TTI).

Figure 15:
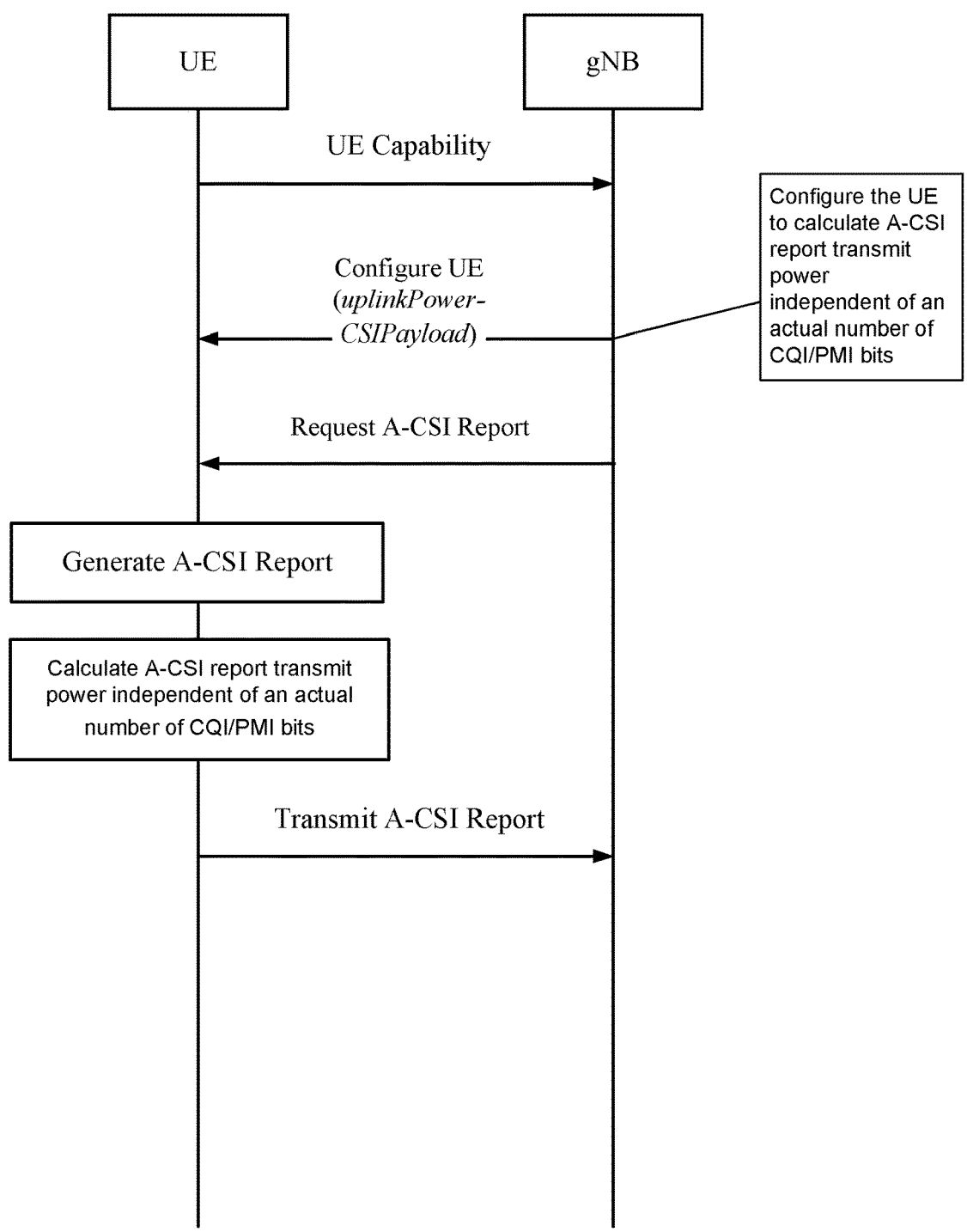
FIG. 15 is a call flow diagram illustrating an example exchange between a UE and a network entity, in accordance with certain aspects of the present disclosure.

FIG. 15 is a call flow diagram illustrating an example exchange between a UE and a gNB, in accordance with certain aspects of the present disclosure. For example, the UE may be configured to perform operations 1200 of FIG. 12 and the gNB may be configured to perform operations 1300. As illustrated, the UE may provide an indication of the UE capability (e.g., to calculate A-CSI report transmit power independent of an actual number of channel quality indicator (CQI) bits to transmit in the A-CSI report). The gNB, in turn, may configure the UE (e.g., via the uplinkPower-CSIPayload parameter) to calculate A-CSI report transmit power independent of an actual number of channel quality indicator (CQI/PMI) bits to transmit in the A-CSI report (e.g., if shortened TTI processing timelines might prevent the UE from knowing the actual bits in sufficient time for transmit power calculation). As illustrated, the UE generates the A-CSI report, calculates a transmit power for the A-CSI report independent of the actual number of CQI/PMI bits to transmit in the A-CSI report, and transmits the A-CSI report in accordance with the calculated transmit power.

In some cases, the UE capabilities for sTTI PUSCH power control proposed above can be defined separately for various scenarios, such as slot TTI and subslot TTI (e.g., generally based on TTI length), different processing timelines and maximum timing adjustment values (TAs).

EXAMPLE EMBODIMENTS

Embodiment 1

A method for wireless communications by a user equipment (UE), comprising receiving signaling of a configuration parameter, receiving a request for an aperiodic channel state information (A-CSI) report, calculating a transmit power for the A-CSI report that is independent of an actual number of channel quality indicator (CQI) bits to transmit in the A-CSI report when the configuration parameter is set to a first value or dependent on the actual number of CQI bits to transmit in the A-CSI report when the configuration parameter is set to a second value, and transmitting the A-CSI report in accordance with the calculated transmit power.

Embodiment 2

The method of Embodiment 1, wherein the configuration parameter is associated with a reduced transmission time interval (TTI) for uplink transmissions by the UE.

Embodiment 3

The method of any of Embodiments 1-2, wherein the transmit power calculated for the A-CSI report is independent of an actual number of CQI and precoding matrix indicator (CQI/PMI) bits to transmit in the A-CSI report.

Embodiment 4

The method of any of Embodiments 1-3, wherein the transmit power is calculated based, at least in part, on a bits per resource element (BPRE) parameter, and calculating transmit power for the A-CSI report independently of the actual number of CQI bits to transmit in the A-CSI report comprises determining a value for the BPRE parameter that is independent of the actual number of CQI bits to transmit in the A-CSI report.

Embodiment 5

The method of Embodiment 4, wherein determining a value for the BPRE parameter that is independent of the actual number of CQI bits to transmit in the A-CSI report comprises calculating the value for the BPRE parameter assuming a maximum number of CQI bits corresponding to a rank indicator in a set of rank indicators supported by the UE.

Embodiment 6

The method of Embodiment 5, wherein the value for the BPRE parameter is calculated assuming a maximum number of CQI/PMI bits corresponding to the rank indicator in the set of rank indicators supported by the UE when the A-CSI report is to be sent in a physical uplink shared channel (PUSCH) without uplink shared channel (UL-SCH) data.

Embodiment 7

The method of Embodiment 6, wherein the maximum number of CQI/PMI bits comprises cyclic redundancy check (CRC) bits.

Embodiment 8

The method of any of Embodiments 1-7, further comprising providing an indication of a capability of the UE to support determining the value for the BPRE parameter that is independent of the actual number of CQI/PMI bits.

Embodiment 9

The method of Embodiment 8, wherein the UE provides the indication of the capability for a given transmission time interval (TTI) length.

Embodiment 10

The method of Embodiment 9, wherein the given TTI length comprises at least one of a slot or sub-slot.

Embodiment 11

An apparatus for wireless communications by a user equipment (UE), comprising means for receiving signaling of a configuration parameter, means for receiving a request for an aperiodic channel state information (A-CSI) report, means for calculating a transmit power for the A-CSI report that is independent of an actual number of channel quality indicator (CQI) bits to transmit in the A-CSI report when the configuration parameter is set to a first value or dependent on the actual number of CQI bits to transmit in the A-CSI report when the configuration parameter is set to a second value, and means for transmitting the A-CSI report in accordance with the calculated transmit power.

Embodiment 12

The apparatus of Embodiment 11, wherein the configuration parameter is associated with a reduced transmission time interval (TTI) for uplink transmissions by the UE.

Embodiment 13

The apparatus of any of Embodiments 11-12, wherein the transmit power calculated for the A-CSI report is independent of an actual number of CQI and precoding matrix indicator (CQI/PMI) bits to transmit in the A-CSI report.

Embodiment 14

The apparatus of any of Embodiments 11-13, wherein the transmit power is calculated based, at least in part, on a bits per resource element (BPRE) parameter, and means for calculating transmit power for the A-CSI report independently of the actual number of CQI bits to transmit in the A-CSI report comprises means for determining a value for the BPRE parameter that is independent of the actual number of CQI bits to transmit in the A-CSI report.

Embodiment 15

The apparatus of Embodiment 14, wherein means for determining a value for the BPRE parameter that is independent of the actual number of CQI bits to transmit in the A-CSI report comprises means for calculating the value for the BPRE parameter assuming a maximum number of CQI bits corresponding to a rank indicator in a set of rank indicators supported by the UE.

Embodiment 16

The apparatus of Embodiment 15, wherein the value for the BPRE parameter is calculated assuming a maximum number of CQI bits corresponding to the rank indicator in the set of rank indicators supported by the UE when the A-CSI report is to be sent in a physical uplink shared channel (PUSCH) without uplink shared channel (UL-SCH) data.

Embodiment 17

The apparatus of Embodiment 16, wherein the maximum number of CQI/PMI bits comprises a cyclic redundancy check (CRC) bits.

Embodiment 18

The apparatus of any of Embodiments 11-17, further comprisingmeans for providing an indication of a capability of the UE to support determining the value for the BPRE parameter that is independent of the actual number of CQI/PMI bits.

Embodiment 19

The apparatus of Embodiment 18, wherein the UE provides the indication of the capability for a given transmission time interval (TTI) length.

Embodiment 20

The apparatus of Embodiment 19, wherein the given TTI length comprises at least one of a slot or sub-slot.

Embodiment 21

An apparatus for wireless communications by a user equipment (UE), comprising a receiver configured to receive signaling of a configuration parameter and a request for an aperiodic channel state information (A-CSI) report, at least one processor configured to calculate a transmit power for the A-CSI report that is independent of an actual number of channel quality indicator (CQI) bits to transmit in the A-CSI report when the configuration parameter is set to a first value or dependent on the actual number of CQI bits to transmit in the A-CSI report when the configuration parameter is set to a second value, and a transmitter configured to transmit the A-CSI report in accordance with the calculated transmit power.

Embodiment 22

The apparatus of Embodiment 21, wherein the configuration parameter is associated with a reduced transmission time interval (TTI) for uplink transmissions by the UE.

Embodiment 23

The apparatus of any of Embodiments 21-22, wherein the transmit power calculated for the A-CSI report is independent of an actual number of CQI and precoding matrix indicator (CQI/PMI) bits to transmit in the A-CSI report.

Embodiment 24

The apparatus of any of Embodiments 21-23, wherein the transmit power is calculated based, at least in part, on a bits per resource element (BPRE) parameter, and the transmit power for the A-CSI report is calculated independently of the actual number of CQI bits to transmit in the A-CSI report by determining a value for the BPRE parameter that is independent of the actual number of CQI bits to transmit in the A-CSI report.

Embodiment 25

The apparatus of Embodiment 24, wherein the at least one processor is configured to determine a value for the BPRE parameter that is independent of the actual number of CQI bits to transmit in the A-CSI report by calculating the value for the BPRE parameter assuming a maximum number of CQI bits corresponding to a rank indicator in a set of rank indicators supported by the UE.

Embodiment 26

The apparatus of Embodiment 25, wherein the value for the BPRE parameter is calculated assuming a maximum number of CQI bits corresponding to the rank indicator in the set of rank indicators supported by the UE when the A-CSI report is to be sent in a physical uplink shared channel (PUSCH) without uplink shared channel (UL-SCH) data.

Embodiment 27

The apparatus of Embodiment 26, wherein the maximum number of CQI/PMI bits comprises cyclic redundancy check (CRC) bits.

Embodiment 28

The apparatus of any of Embodiments 21-27, wherein the at least one processor is further configured to provide an indication of a capability of the UE to support determining the value for the BPRE parameter that is independent of the actual number of CQI bits.

Embodiment 29

The apparatus of Embodiment 28, wherein the UE provides the indication of the capability for a given transmission time interval (TTI) length.

Embodiment 30

The apparatus of Embodiment 29, wherein the given TTI length comprises at least one of a slot or sub-slot.

Embodiment 31

A non-transitory computer readable medium having instructions stored thereon for receiving signaling of a configuration parameter, receiving a request for an aperiodic channel state information (A-CSI) report, calculating a transmit power for the A-CSI report that is independent of an actual number of channel quality indicator (CQI) bits to transmit in the A-CSI report when the configuration parameter is set to a first value or dependent on the actual number of CQI bits to transmit in the A-CSI report when the configuration parameter is set to a second value, and transmitting the A-CSI report in accordance with the calculated transmit power.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 10A:
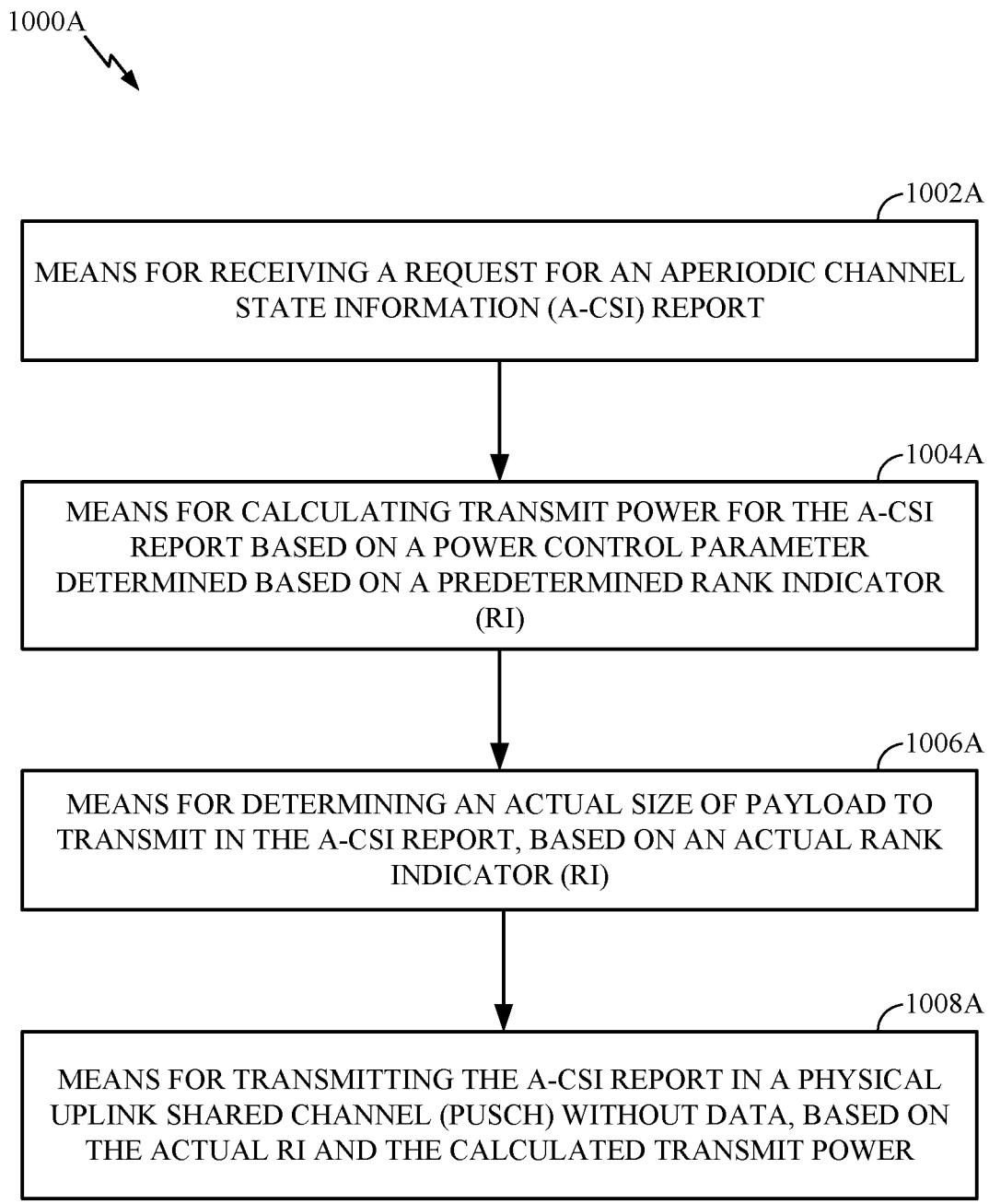
FIG. 10A illustrates example components capable of performing operations of FIG. 10.
Figure 12A:
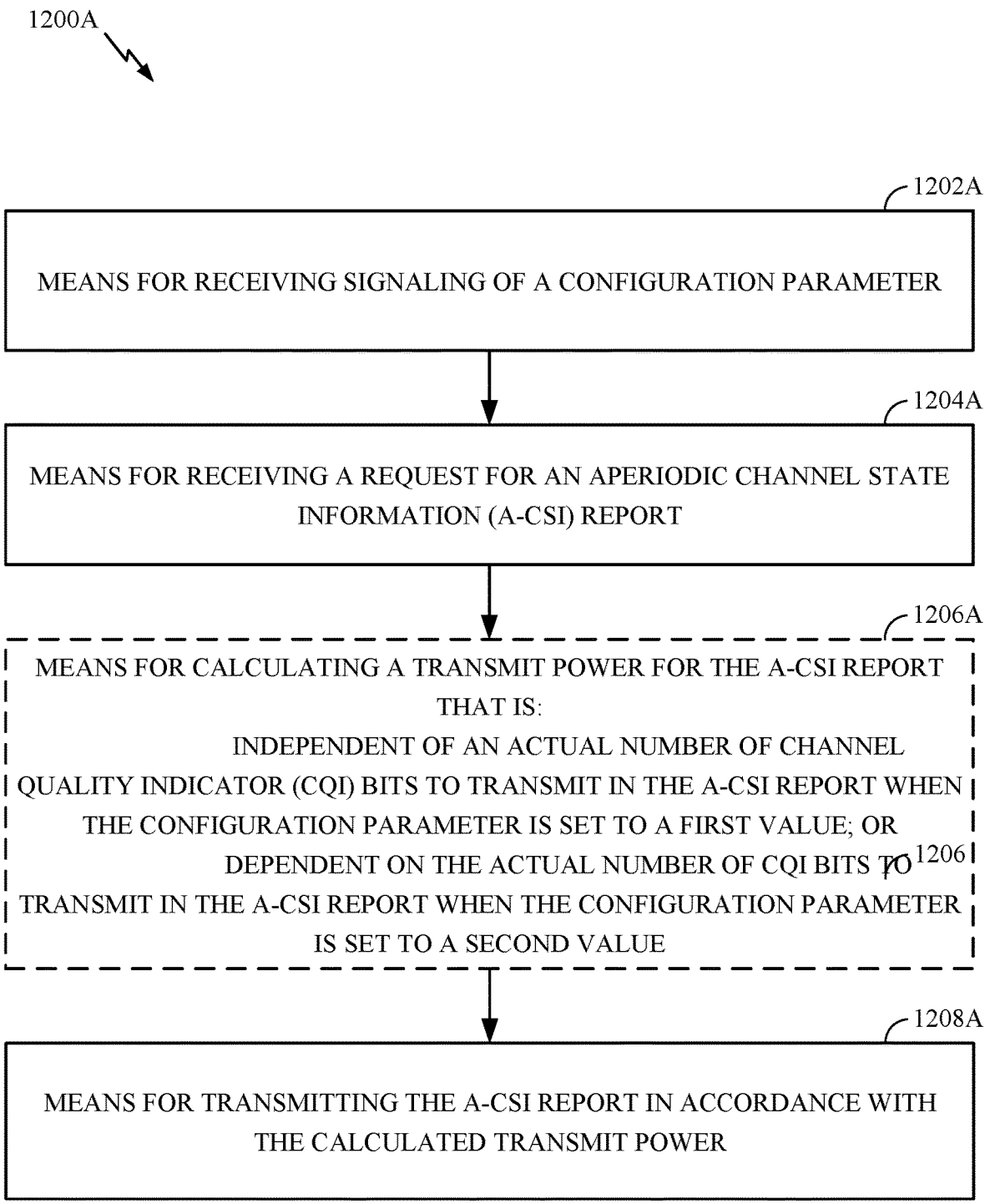
FIG. 12A illustrates example components capable of performing operations of FIG. 12.
Figure 13A:
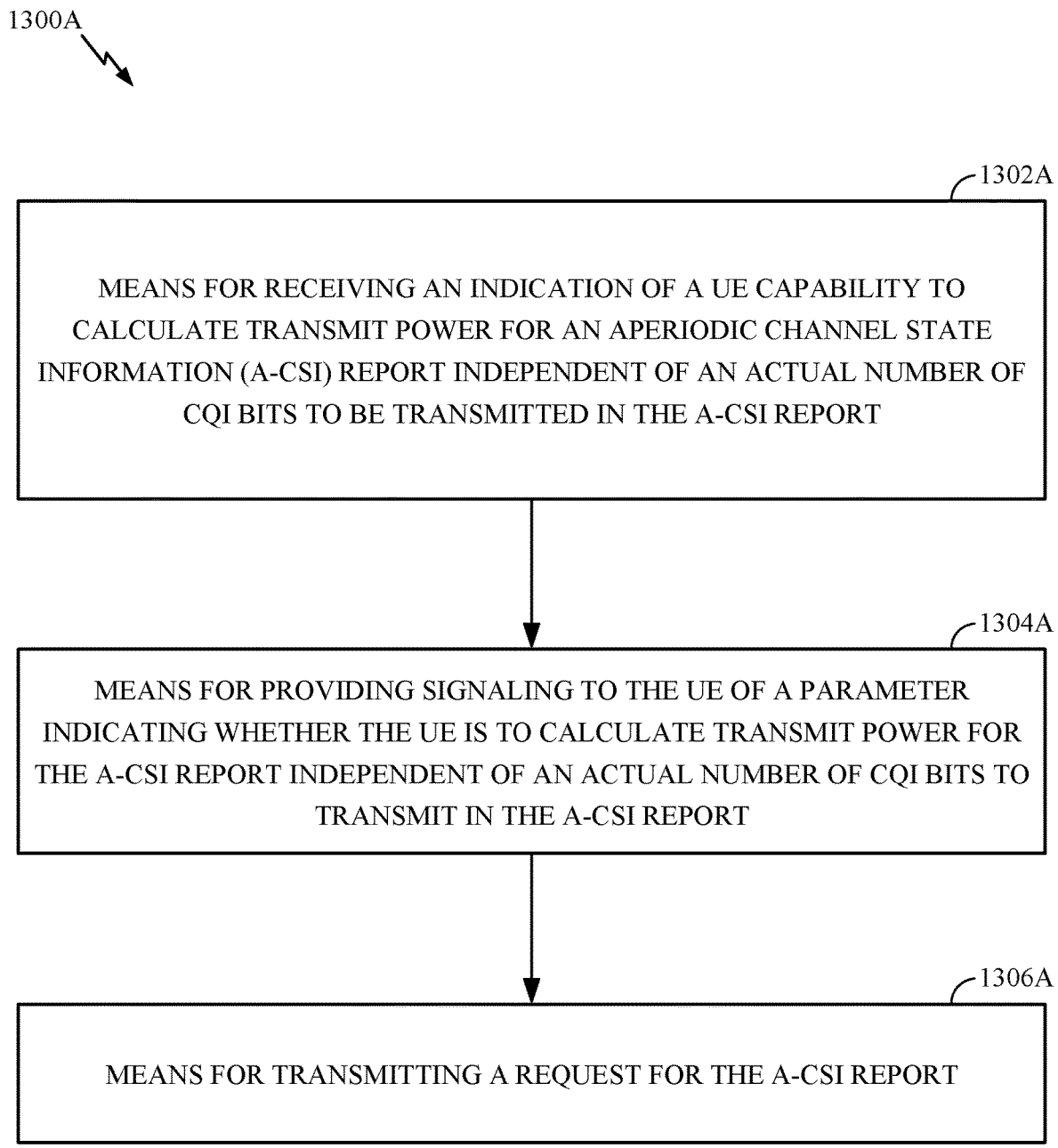
FIG. 13A illustrates example components capable of performing operations of FIG. 13.

The various operations of methods described above may be performed by any suitable means capable of performing the corresponding functions. For example, operations 1000, 1200, and 1300 of FIGS. 10, 12, and 13 may be performed by corresponding means 1000A, 1200A, and 1300A of FIGS. 10A, 12A, and 13A. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for calculating, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    receiving signaling of a configuration parameter;
    receiving a request for an aperiodic channel state information (A-CSI) report;
    calculating a transmit power for the A-CSI report that is:
        independent of an actual number of channel quality indicator (CQI) bits to transmit in the A-CSI report when the configuration parameter is set to a first value, or
        dependent on the actual number of CQI bits to transmit in the A-CSI report when the configuration parameter is set to a second value; and
    transmitting the A-CSI report in accordance with the calculated transmit power.

2. The method of claim 1, wherein the configuration parameter is associated with a reduced transmission time interval (TTI) for uplink transmissions by the UE.

3. The method of claim 1, wherein the transmit power calculated for the A-CSI report is independent of an actual number of CQI and precoding matrix indicator (CQI/PMI) bits to transmit in the A-CSI report.

4. The method of claim 3, wherein:
    the transmit power is calculated based, at least in part, on a bits per resource element (BPRE) parameter; and
    calculating transmit power for the A-CSI report independently of the actual number of CQI/PMI bits to transmit in the A-CSI report comprises determining a value for the BPRE parameter that is independent of the actual number of CQI/PMI bits to transmit in the A-CSI report.

5. The method of claim 4, further comprising:
    providing an indication of a capability of the UE to support determining the value for the BPRE parameter that is independent of the actual number of CQI/PMI bits.

6. The method of claim 5, wherein the UE provides the indication of the capability for a given transmission time interval (TTI) length.

7. The method of claim 6, wherein:
    the given TTI length comprises at least one of a slot or sub-slot.

8. The method of claim 3, wherein determining a value for the BPRE parameter that is independent of the actual number of CQI/PMI bits to transmit in the A-CSI report comprises:
    calculating the value for the BPRE parameter assuming a maximum number of CQI/PMI bits corresponding to a rank indicator in a set of rank indicators supported by the UE.

9. The method of claim 3, wherein the value for the BPRE parameter is calculated assuming a maximum number of CQI/PMI bits corresponding to the rank indicator in the set of rank indicators supported by the UE when the A-CSI report is to be sent in a physical uplink shared channel (PUSCH) without uplink shared channel (UL-SCH) data.

10. The method of claim 9, wherein the maximum number of CQI/PMI bits comprises cyclic redundancy check (CRC) bits.

11. An apparatus for wireless communications by a user equipment (UE), comprising:
    means for receiving signaling of a configuration parameter;
    means for receiving a request for an aperiodic channel state information (A-CSI) report;

means for calculating a transmit power for the A-CSI report that is:
  independent of an actual number of channel quality indicator (CQI) bits to transmit in the A-CSI report when the configuration parameter is set to a first value, or
  dependent on the actual number of CQI bits to transmit in the A-CSI report when the configuration parameter is set to a second value; and
means for transmitting the A-CSI report in accordance with the calculated transmit power.

12. The apparatus of claim 11, wherein the configuration parameter is associated with a reduced transmission time interval (TTI) for uplink transmissions by the UE.

13. The apparatus of claim 11, wherein the transmit power calculated for the A-CSI report is independent of an actual number of CQI and precoding matrix indicator (CQI/PMI) bits to transmit in the A-CSI report.

14. The apparatus of claim 13, wherein:
  the transmit power is calculated based, at least in part, on a bits per resource element (BPRE) parameter; and
  the means for calculating transmit power for the A-CSI report independently of the actual number of CQI/PMI bits to transmit in the A-CSI report comprises means for determining a value for the BPRE parameter that is independent of the actual number of CQI/PMI bits to transmit in the A-CSI report.

15. The apparatus of claim 14, wherein the means for determining a value for the BPRE parameter that is independent of the actual number of CQI/PMI bits to transmit in the A-CSI report comprises:
  means for calculating the value for the BPRE parameter assuming a maximum number of CQI/PMI bits corresponding to a rank indicator in a set of rank indicators supported by the UE.

16. The apparatus of claim 15, wherein the value for the BPRE parameter is calculated assuming the maximum number of CQI/PMI bits corresponding to the rank indicator in the set of rank indicators supported by the UE when the A-CSI report is to be sent in a physical uplink shared channel (PUSCH) without uplink shared channel (UL-SCH) data.

17. The apparatus of claim 16, wherein the maximum number of CQI/PMI bits comprises cyclic redundancy check (CRC) bits.

18. The apparatus of claim 14, further comprising:
  means for providing an indication of a capability of the UE to support determining the value for the BPRE parameter that is independent of the actual number of CQI/PMI bits.

19. The apparatus of claim 18, wherein the indication of the capability is provided for a given transmission time interval (TTI) length.

20. The apparatus of claim 19, wherein:
  the given TTI length comprises at least one of a slot or sub-slot.

21. An apparatus for wireless communications by a user equipment (UE), comprising:
  a receiver configured to receive signaling of a configuration parameter and a request for an aperiodic channel state information (A-CSI) report;
  at least one processor configured to calculate a transmit power for the A-CSI report that is:
    independent of an actual number of channel quality indicator (CQI) bits to transmit in the A-CSI report when the configuration parameter is set to a first value, or
    dependent on the actual number of CQI bits to transmit in the A-CSI report when the configuration parameter is set to a second value; and
  a transmitter configured to transmit the A-CSI report in accordance with the calculated transmit power.

22. The apparatus of claim 21, wherein the configuration parameter is associated with a reduced transmission time interval (TTI) for uplink transmissions by the UE.

23. The apparatus of claim 21, wherein the transmit power calculated for the A-CSI report is independent of an actual number of CQI and precoding matrix indicator (CQI/PMI) bits to transmit in the A-CSI report.

24. The apparatus of claim 23, wherein:
  the transmit power is calculated based, at least in part, on a bits per resource element (BPRE) parameter; and
  the transmit power for the A-CSI report is calculated independently of the actual number of CQI/PMI bits to transmit in the A-CSI report by determining a value for the BPRE parameter that is independent of the actual number of CQI/PMI bits to transmit in the A-CSI report.

25. The apparatus of claim 24, wherein the at least one processor is configured to determine a value for the BPRE parameter that is independent of the actual number of CQI/PMI bits to transmit in the A-CSI report by:
  calculating the value for the BPRE parameter assuming a maximum number of CQI/PMI bits corresponding to a rank indicator in a set of rank indicators supported by the UE.

26. The apparatus of claim 25, wherein the value for the BPRE parameter is calculated assuming the maximum number of CQ/PMI I bits corresponding to the rank indicator in the set of rank indicators supported by the UE when the A-CSI report is to be sent in a physical uplink shared channel (PUSCH) without uplink shared channel (UL-SCH) data.

27. The apparatus of claim 26, wherein the maximum number of CQI/PMI bits comprises cyclic redundancy check (CRC) bits.

28. The apparatus of claim 24, wherein the at least one processor is further configured to:
  provide an indication of a capability of the UE to support determining the value for the BPRE parameter that is independent of the actual number of CQI/PMI bits.

29. The apparatus of claim 28, wherein the UE provides the indication of the capability for a given transmission time interval (TTI) length.

30. The apparatus of claim 29, wherein:
  the given TTI length comprises at least one of a slot or sub-slot.

31. A non-transitory computer readable medium having instructions stored thereon for:
  receiving signaling of a configuration parameter;
  receiving a request for an aperiodic channel state information (A-CSI) report;
  calculating a transmit power for the A-CSI report that is independent of an actual number of channel quality indicator (CQI) bits to transmit in the A-CSI report if the configuration parameter is set to a first value or dependent on the actual number of CQI bits to transmit in the A-CSI report if the configuration parameter is set to a second value; and
  transmitting the A-CSI report in accordance with the calculated transmit power.

* * * * *